US011817097B2

(12) United States Patent
Jang et al.

(10) Patent No.: US 11,817,097 B2
(45) Date of Patent: *Nov. 14, 2023

(54) ELECTRONIC APPARATUS AND ASSISTANT SERVICE PROVIDING METHOD THEREOF

(71) Applicant: Samsung Electronics Co., Ltd., Suwon-si (KR)

(72) Inventors: Wonnam Jang, Suwon-si (KR); Sooyeon Kim, Suwon-si (KR); Sungrae Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,809

(22) Filed: Mar. 3, 2022

(65) Prior Publication Data

US 2022/0270605 A1 Aug. 25, 2022

Related U.S. Application Data

(63) Continuation of application No. 16/593,077, filed on Oct. 4, 2019, now Pat. No. 11,302,319.

(30) Foreign Application Priority Data

Oct. 5, 2018 (KR) .................. 10-2018-0119100

(51) Int. Cl.
*G10L 15/22* (2006.01)
*G10L 15/30* (2013.01)
*G06N 20/00* (2019.01)
*H04L 67/10* (2022.01)

(52) U.S. Cl.
CPC .............. *G10L 15/22* (2013.01); *G06N 20/00* (2019.01); *G10L 15/30* (2013.01); *G10L 2015/223* (2013.01); *H04L 67/10* (2013.01)

(58) Field of Classification Search
USPC ................ 704/231, 232, 246, 247, 251, 252
See application file for complete search history.

(56) References Cited

U.S. PATENT DOCUMENTS 9,514,748 B2 12/2016 Reddy et al.
10,069,976 B1 * 9/2018 Gunther .................. G10L 21/06
(Continued)

FOREIGN PATENT DOCUMENTS

CN 107919123 A 4/2018
KR 10-1619265 B1 5/2016
(Continued)

OTHER PUBLICATIONS

International Search Report dated Jan. 22, 2020, issued in International Application No. PCT/KR2019/013046.
(Continued)

*Primary Examiner* — Leonard Saint-Cyr
(74) *Attorney, Agent, or Firm* — Jefferson IP Law, LLP

(57) ABSTRACT

An electronic apparatus is provided. The electronic apparatus includes a communicator, a memory, and a processor connected to the communicator and the memory and configured to control the electronic apparatus. The processor is configured to, by executing at least one command stored in the memory, based on a user input for executing an assistant service being received, transmit information on a user voice acquired by the electronic apparatus to a plurality of servers providing different assistant services through the communicator, and based on a plurality of response information being received from the plurality of servers, provide a response on the user voice based on at least one of the plurality of response information. The plurality of servers provide the assistant service using an artificial intelligence agent.

6 Claims, 34 Drawing Sheets

(56) References Cited

U.S. PATENT DOCUMENTS

| | | |
|---|---|---|
| 10,685,656 B2* | 6/2020 | Patil ..................... G10L 15/28 |
| 2004/0267535 A1 | 12/2004 | Kotzin |
| 2014/0244712 A1 | 8/2014 | Walters et al. |
| 2014/0310002 A1 | 10/2014 | Nitz et al. |
| 2015/0185996 A1 | 7/2015 | Brown et al. |
| 2016/0269904 A1 | 9/2016 | Sharma et al. |
| 2017/0220361 A1 | 8/2017 | Sharma et al. |
| 2018/0061418 A1 | 3/2018 | Patil et al. |
| 2018/0063624 A1 | 3/2018 | Boesen |
| 2018/0108066 A1 | 4/2018 | Kale et al. |
| 2018/0108343 A1 | 4/2018 | Stevans et al. |
| 2019/0295549 A1* | 9/2019 | Oh ......................... G10L 15/22 |
| 2019/0318734 A1 | 10/2019 | Nair |
| 2019/0371312 A1* | 12/2019 | Naughton ............ G10L 15/22 |

FOREIGN PATENT DOCUMENTS

| | | |
|---|---|---|
| KR | 10-2016-0108348 A | 9/2016 |
| KR | 10-2018-0045633 A | 5/2018 |
| KR | 10-2018-0108400 A | 10/2018 |
| WO | 2017/222503 A1 | 12/2017 |

OTHER PUBLICATIONS

Korean office Action dated Mar. 15, 2023, issued in Korean Application No. 10-2018-0119100.
Korean Notice of Final Rejection dated Sep. 26, 20223, issued in Korean Application No. 10-2018-0119100.

* cited by examiner

YYY : MAY I TELL YOU IN KOREAN TIME? —1820

ELECTRONIC APPARATUS AND ASSISTANT SERVICE PROVIDING METHOD THEREOF

CROSS-REFERENCE TO RELATED APPLICATIONS

This application is a continuation application of prior application Ser. No. 16/593,077, filed on Oct. 4, 2019, which application is based on and claims priority under 35 U.S.C. § 119(a) of a Korean patent application number 10-2018-0119100, filed on Oct. 5, 2018, in the Korean Intellectual Property Office, the disclosure of which is incorporated by reference herein in its entirety.

BACKGROUND

1. Field

The disclosure relates to an electronic apparatus and an assistant service providing method thereof. More particularly, the disclosure relates to an electronic apparatus providing an assistant service and an assistant service providing method thereof.

2. Description of the Related Art

In recent years, artificial intelligence systems that realize human-level intelligence have been used in various fields. The artificial intelligence systems, unlike existing rule-based smart systems, are systems in which machine learn and judge by itself to become smart. Artificial intelligence systems are improving in recognition rate and more accurately understand users' taste. The existing rule-based smart systems are gradually replaced by deep learning-based artificial intelligence systems.

An artificial intelligence technology includes machine learning (e.g., deep learning) and an elementary technology utilizing machine learning.

Machine learning is an algorithm technology that classifies/learns features of input data by itself, and elementary technology is a technology that simulates functions of cognition, judgment, and the like, of the human brain using the machine learning algorithm such as deep learning and includes technical fields such as linguistic understanding, visual comprehension, reasoning/prediction, expression of knowledge, motion control, and the like.

Artificial intelligence technology is currently used in various fields, and, in particular, an assistant service (e.g., voice assistant or voice assistant service) providing a response on a user input (in particular, user voice) using an artificial intelligence model is provided.

Although such assistant services differ in domains having excellent performance, the currently released electronic apparatuses provide only one assistant service, and thus, a method for providing the assistant services to users more usefully is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages to provide at least the advantages described below. Accordingly, an aspect of the disclosure is to provide an electronic apparatus capable of providing various assistant services and an assistance service providing method thereof.

Additional aspects will be set forth in part in the description which follows and, in part, will be apparent from the description, or may be learned by practice of the presented embodiments.

In accordance with an aspect of the disclosure, an electronic apparatus is provided. The electronic device includes a communicator, a memory, and a processor connected to the communicator and the memory and configured to control the electronic apparatus, wherein the processor is configured to, by executing at least one command stored in the memory, based on a user input for executing an assistant service being received, transmit information on a user voice acquired by the electronic apparatus to a plurality of servers providing different assistant services through the communicator, and based on a plurality of response information being received from the plurality of servers, provide a response on the user voice based on at least one of the plurality of response information, and wherein the plurality of servers provide the assistant service using an artificial intelligence agent.

The processor may be further configured to, based on a user input for executing a first assistant service being received, transmit the information on the user voice to a first server providing the first assistant service and a second server providing a second assistant service, and based on the response information received from the first server among the plurality of response information received from the first and second servers, provide a response on the user voice.

The processor may be further configured to, based on a first wakeup word for executing the first assistant service being identified in a first user voice acquired by the electronic apparatus, transmit information on the first user voice to a first server providing the first assistant service and a second server providing a second assistant service, and based on the transmission of the information on the first user voice, provide a response on the first user voice based on the response information received from the first server among the plurality of response information received from the first server and the second server.

The processor may be further configured to determine whether a second user voice acquired after the first user voice corresponds to a voice requesting a response result of another assistant service regarding the first user voice.

The processor may be further configured to, based on the second user voice corresponding to a voice requesting a response result of the second assistant service regarding the first user voice, provide a response on the second user voice based on response information received from the second server among the plurality of response information received based on the transmission of the information on the first user voice.

The processor may be further configured to, based on the second user voice not corresponding to the voice requesting a response result of the other assistant service, transmit information on the second user voice to the first server and the second server and, based on the transmission of the information on the second user voice, and provide a response on the second user voice based on the response information received from the first server among the plurality of response information received from the first server and the second server.

The processor may be further configured to, based on the user voice being acquired after the user input is received by selection of a predetermined button, transmit the information on the user voice to the plurality of servers and, based on the plurality of response information being received from the plurality of servers, provide a plurality of responses on the user voice based on the plurality of response information.

The processor may be further configured to output the plurality of responses in different forms based on at least one of a user preference for the plurality of assistant services provided from the plurality of servers and accuracy of the plurality of response information.

In accordance with another aspect of the disclosure, an assistant service providing method of an electronic apparatus is provided. The assistant service providing method includes transmitting, based on a user input for executing an assistant service being received, information on a user voices acquired by the electronic apparatus to a plurality of providing servers providing different assistant services, and providing, based on a plurality of response information being received from the plurality of servers, a response on the user voice based on at least one of the plurality of received response information, wherein the plurality of servers provide the assistant service using an artificial intelligence agent.

The transmitting of the information may include transmitting, based on a user input for executing the first assistant service being received, the information on the user voice to a first server providing a first assistant service and a second server providing a second assistant service, and the providing of the response may include providing the response on the user voice based on the response information received from the first server among the plurality of response information received from the first and second servers.

The transmitting of the information may include transmitting, based on a first wakeup word for executing a first assistant service being identified in the first user voice acquired by the electronic apparatus, information on a first user voice to a first server providing the first assistant service and a second server providing a second assistant service, and the providing of the response may include providing, based on the transmission of the information on the first user voice, a response on the first user voice based on the response information received from the first server among the plurality of response information received from the first server and the second server.

The method may further include, determining whether a second user voice acquired after the first user voice corresponds to a voice requesting a response result of another assistant service regarding the first user voice.

The method may further include, providing, based on the second user voice corresponding to a voice requesting a response result of the second assistant service regarding the first user voice, a response on the second user voice based on response information received from the second server among the plurality of response information received based on the transmission of the information on the first user voice.

The method may further include, transmitting, based on the second user voice not corresponding to the voice requesting the response result of the other assistant service, information on the second user voice to the first server and the second server and providing, based on the transmission of the information on the second user voice, a response on the second user voice based on the response information received from the first server among the plurality of response information received from the first server and the second server.

The transmitting of the information may include transmitting, based on the user voice being acquired after the user input is received by selection of a predetermined button, the information on the user voice to the plurality of servers, and the providing may include providing, based on the plurality of response information being received from the plurality of server, a plurality of responses on the user voice based on the plurality of response information.

The providing of the response may include outputting the plurality of responses in different forms based on at least one of a user preference for the plurality of assistant services provided from the plurality of servers and accuracy of the plurality of response information.

According to the diverse embodiments of the disclosure, satisfaction and convenience of a user who uses the assistant service can be improved in that responses of various assistant services are received.

Other aspects, advantages, and salient features of the disclosure will become more apparent to those skilled in the art from the following detailed description which, taken in conjunction with annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
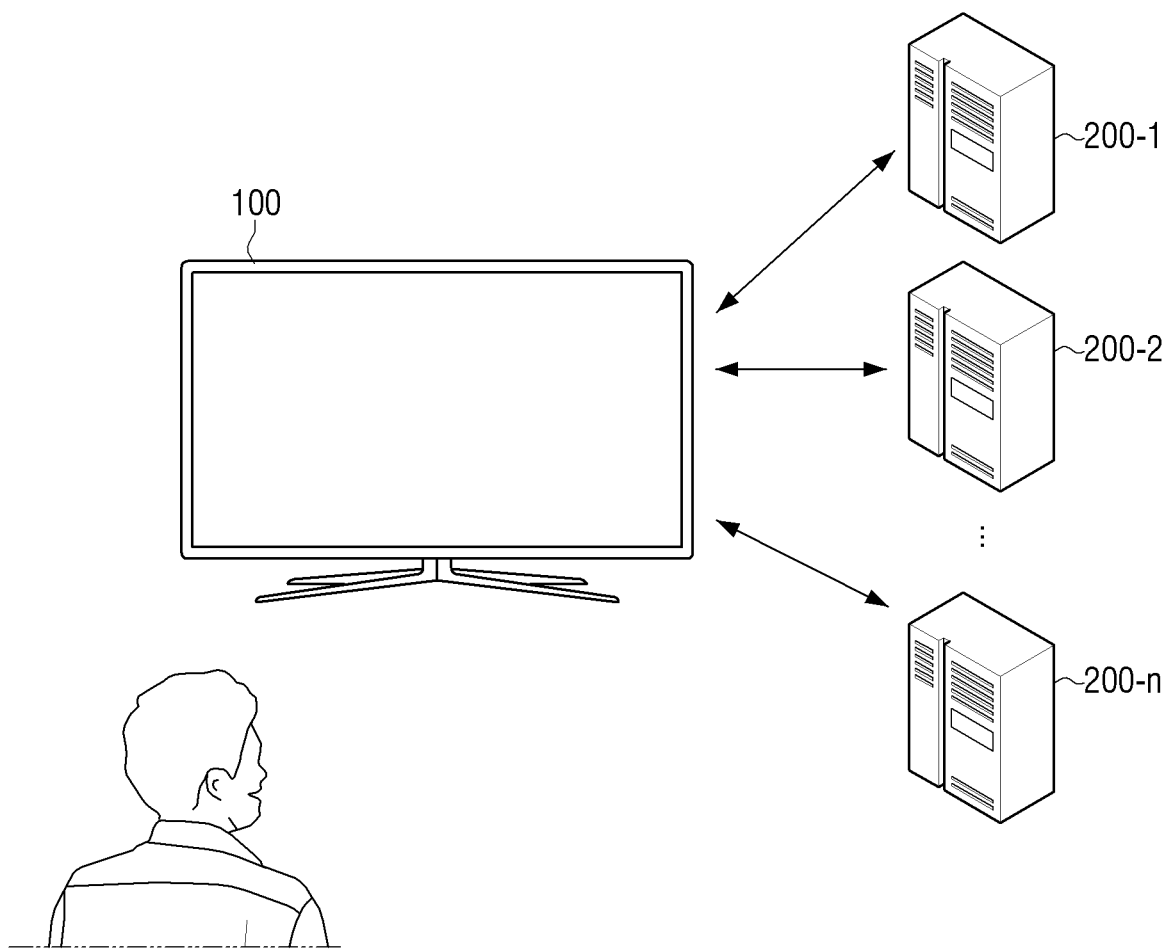
FIG. 1A is a view illustrating a system for providing an assistant service according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "having", "may have", "comprising", or "may comprise" used in the disclosure indicates presence of corresponding characteristics (e.g., components such as numerical value, function, operation, or element) and does not limit additional at least one function, operation, or element.

In the disclosure disclosed herein, the expressions "A or B", "at least one of A or/and B", and "one or more A or/and B" used herein may include any and all combinations of one or more of the associated listed items. For example, "A or B", "at least one of A and B" or "at least one of A or B" may include all the cases of (1) including at least one A, (2) including at least one B, or (3) including at least one A and at least one B.

Expressions such as "first," or "second," and the like, may express their components regardless of their priority or importance and may be used to distinguish one component from another component but is not limited to these components.

When an element (e.g., first element) is referred to as being "(operatively or communicatively) coupled with/to" or "connected to" another (e.g., second) element, it may be directly coupled with/to or connected to the other element or an intervening element (e.g., a third element) may be present. However, when it is described that an element (e.g., first element) is "directly coupled" to another element (e.g., second element), no element (e.g., third element) may exist between the element and the other element.

According to the situation, the expression "configured to (or set to)" used herein may be interchangeably used as, for example, the expression "suitable for", "having the capacity to", "designed to", "adapted to", "made to", or "capable of". The term "configured to" may not necessarily imply "specifically designed to" in hardware. In some situations, the expression "device configured to" may mean that the device, together with other devices or components, "is able to". For example, a "sub-processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

According to various embodiments of the disclosure, an electronic apparatus may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, medical devices, cameras, or wearable devices. A wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit. The electronic apparatus may include at least one of, for example, televisions (TVs), digital versatile disc (DVD) players, speakers, audios, refrigerators, air-conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

The electronic apparatuses may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices, etc.), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, drones, automatic teller's machines (ATMs) of banking institutions, points of sales (POSs) or stores, or internet of things (e.g., light bulbs, various sensors, sprinkler devices, fire alarms, thermostats, street lamps, toasters, exercise equipment, hot water tanks, heaters, boilers, and the like).

The term "user" used herein may refer to a person who uses an electronic apparatus or may refer to a device that uses an electronic apparatus (e.g., an artificial intelligence electronic apparatus).

FIG. 1A is a view illustrating a system for providing an assistant service according to an embodiment of the disclosure.

Referring to FIGS. 1A, 1B, 1C, and 1D, illustrate a television as an electronic apparatus 100 but this is merely an example and the electronic apparatus 100 may be implemented as various types of devices as described above.

Referring to FIG. 1A, the electronic apparatus 100 may provide an assistant service (or a voice assistant service).

To this end, the electronic apparatus 100 may acquire a user voice and transmit information on the acquired user voice to a plurality of servers 200-1, 200-2, . . . , 200-n.

For example, the information on the user voice may be a voice file. That is, the electronic apparatus 100 may generate a voice file, for example, a voice wave file, including the acquired user voice and transmit the voice file to the plurality of servers 200-1, 200-2, . . . , 200-n.

In another example, the information on the user voice may be a compressed voice file. The electronic apparatus 100 may compress the acquired user voice with a codec or the like to generate a compressed voice file and transmit the compressed voice file to the plurality of servers 200-1, 200-2, . . . , 200-n.

In another example, the electronic apparatus 100 may perform preprocessing such as removing noise from an acquired user voice, removing a voice of another speaker excluding a voice of a specific speaker, removing an audio signal before a point in time at which an actual voice starts, and the like, on the acquired user voice, and transmit the preprocessed user voice a plurality of servers 200-1, 200-2, . . . , 200-n. In this case, the preprocessed user voice may be transmitted in the form of a voice file or a compressed voice file to the plurality of servers 200-1, 200-2, . . . , 200-n.

In another example, the electronic apparatus 100 may extract a feature point from the acquired user voice and transmit information on the extracted feature point to the plurality of servers 200-1, 200-2, . . . , 200-n.

The plurality of servers 200-1, 200-2, . . . , 200-n may be a server providing an assistant service using an artificial intelligence agent.

To this end, the plurality of servers 200-1, 200-2, . . . , 200-n may include a dialog system capable of providing a response on the user voice using an artificial intelligence model.

The plurality of servers 200-1, 200-2, . . . , 200-n may perform preprocessing on the user voice and perform voice recognition on the user voice to convert the user voice into text, and grasp an intent and an entity of the user voice based on a voice recognition result. The plurality of servers 200-1, 200-2, . . . , 200-n may acquire information on a response on the user voice based on a result of natural language understanding, and acquire a natural language as response information to the user voice based on the acquired information. The plurality of servers 200-1, 200-2, . . . , 200-n may transmit response information to the electronic apparatus 100.

To this end, the plurality of servers 200-1, 200-2, . . . , 200-n may include an automatic speech recognition (ASR) module, a natural language understanding (NLU) module, a dialog management (DM) module, a natural language generation (NLG) module, and the like.

The electronic apparatus 100 may provide a response on the user voice based on the received response information.

For example, the electronic apparatus 100 may convert text included in the received response information into voice through text to speech (TTS) and output the converted voice through a speaker of the electronic apparatus 100 or a speaker connected to the electronic apparatus 100 or display a user interface including the corresponding text on a display of the electronic apparatus 100.

Accordingly, a conversation system may provide a response on the user voice, whereby the user may conduct a conversation with the electronic apparatus 100.

When the user voice includes an intent to control the electronic apparatus 100 or an external electronic apparatus, the plurality of servers 200-1, 200-2, . . . , 200-n may transmit a command for controlling an electronic device as a control target to the electronic apparatus 100 or an electronic apparatus (not shown) capable of controlling the electronic apparatus as a control target.

For example, it is assumed that the user voice includes an intent to turn on a light (not shown) constituting an Internet of Things (IoT) environment together with the electronic apparatus 100. In this case, the plurality of servers 200-1, 200-2, . . . , 200-n may transmit a command for turning on the light (not shown) to the electronic apparatus 100. In this case, the electronic apparatus 100 may transmit the corresponding command to the light (not shown), and the light (not shown) may be turned on by the command received from the electronic apparatus 100.

However, this is merely an example, and the plurality of servers 200-1, 200-2, . . . , 200-n may transmit a control command in various ways.

The plurality of servers 200-1, 200-2, . . . , 200-n may transmit a control command to an electronic apparatus (not shown) to be controlled. In the above example, the plurality of servers 200-1, 200-2, . . . , 200-n may transmit the command for turning on the light (not shown) to the light (not shown), and the light (not shown) may be turned on by the command received from the plurality of servers 200-1, 200-2, . . . , 200-n.

The plurality of servers 200-1, 200-2, . . . , 200-n may transmit the control command to another electronic apparatus (not shown), and the other electronic apparatus (not shown) may transmit the corresponding command to an electronic apparatus (not shown) to be controlled. In the example described above, it is assumed that a refrigerator (not shown) among a plurality of electronic apparatuses constituting the IoT environment performs a function of controlling an electronic apparatus constituting the IoT environment. In this case, the plurality of servers 200-1, 200-2, . . . , 200-n may transmit a command for turning on a light (not shown) to the refrigerator (not shown). In this case, the refrigerator (not shown) may transmit the corresponding command to the lamp (not shown), and the lamp (not shown) may be turned on by the command received from the refrigerator (not shown).

The plurality of servers 200-1, 200-2, . . . , 200-n may store an artificial intelligence agent for operating a conversation system. The plurality of servers 200-1, 200-2, . . . , 200-n may use an artificial intelligence agent to produce a natural language based on a user voice. The artificial intelligence agent, which is a dedicated program for providing AI (artificial Intelligence)-based services (e.g., voice recognition service, assistant service, translation service, search service, etc.), may be executed by an existing general-purpose processor (e.g., CPU) or by a separate AI-dedicated processor (e.g., GPU, etc.). In particular, the AI agent may control various modules.

According to an embodiment of the disclosure, the plurality of servers 200-1, 200-2, . . . , 200-n may store the AI model trained to produce (or acquire) natural language. The AI model trained in this disclosure may be constructed in consideration of application fields of a recognition model or computer performance of the device. In order to produce natural language, the trained AI model may be, for example, a model based on a neural network. The AI model may be designed to simulate a human brain structure on a computer and may include a plurality of weighted network nodes that simulate the neurons of a human neural network. The plurality of network nodes may form a connection relationship to simulate a synaptic activity of neurons that exchange signals through synapses. In addition, the trained AI model may include, for example, a neural network model or a deep learning model developed from the neural network model. In the deep learning model, a plurality of network nodes may be located at different depths (or layers) and exchange data according to a convolutional connection relationship. Examples of the trained AI model may include, but are not limited to, a deep neural network (DNN), a recurrent neural network (RNN), a bidirectional recurrent deep neural network (BRDNN), and the like.

As described above, for speech recognition, operations such as preprocessing on a user voice, converting the user voice into text, and recognizing a meaning in the text (i.e., grasping intent and entity) are performed. In the above example, these operations are performed in the plurality of servers 200-1, 200-2, . . . , 200-n but it is merely an example and at least some of the operations may be performed in another electronic apparatus (not shown).

At least some of the operations for speech recognition may be performed in the electronic apparatus 100. In this case, a module for performing the corresponding operations may be provided in the electronic apparatus (not shown).

For example, the electronic apparatus 100 may perform preprocessing on the user voice and convert the user voice into text. In addition, the electronic apparatus 100 may transmit information on the text converted from the user voice to the plurality of servers 200-1, 200-2, . . . , 200-n. In this case, the plurality of servers 200-1, 200-2, . . . , 200-n may grasp the intent and the entity of the user voice from the text and transmit response information on the user voice to the electronic apparatus 100 based on the result of natural language understanding.

In another example, the electronic apparatus 100 may perform preprocessing on the user voice, converts the user voice into text, grasp the intent and entity of the user voice in the text, and transmit information on the result of natural language understanding to the plurality of servers 200-1, 200-2, . . . , 200-n. In this case, the plurality of servers 200-1, 200-2, . . . , 200-n may acquire information on a response on the user voice based on the information received from the electronic apparatus 100 and natural language as response information to the user voice. The plurality of servers 200-1, 200-2, . . . , 200-n may transmit the response information to the electronic apparatus 100.

At least some of the operations for speech recognition may be performed in another electronic apparatus (not shown). In this case, a module for performing the operation may be provided in the other electronic apparatus (not shown).

Figure 1B:
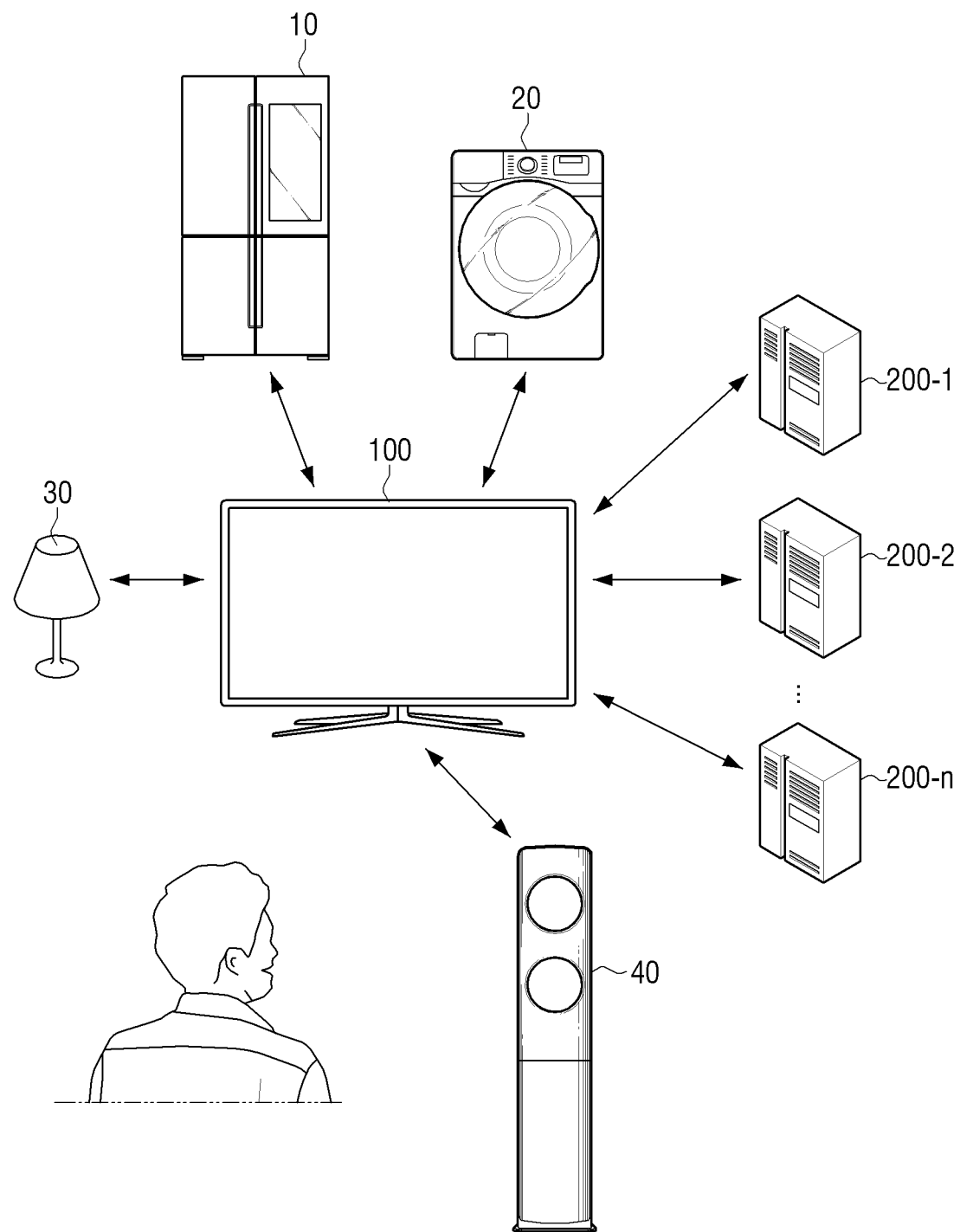
FIG. 1B is a view illustrating a system for providing an assistant service according to an embodiment of the disclosure.

Referring to FIG. 1B, it is assumed that the electronic apparatus 100 configures an IoT environment in a home together with a refrigerator 10, a washing machine 20, a light 30, and an air-conditioner 40.

In this case, the electronic apparatus 100 may transmit the acquired user voice to the refrigerator 10. The refrigerator 10 may perform preprocessing on the user voice received from the electronic apparatus 100, convert the user voice into text, and transmit information on the text converted from the user voice to the electronic apparatus 100. In this case, the electronic apparatus 100 may transmit the text information received from the refrigerator 10 to the plurality of servers 200-1, 200-2, . . . , 200-n. The plurality of servers 200-1, 200-2, . . . , 200-n grasp the intent and the entity of the user voice from the text and transmit response information on the user voice to the electronic apparatus 100 based on a result of natural language understanding.

In addition, at least some of the operations for speech recognition may be performed by a plurality of electronic apparatuses (not shown).

Referring to FIG. 1B, the electronic apparatus 100 may transmit the acquired user voice to the refrigerator 10. In this case, the refrigerator 10 may perform preprocessing on the user voice received from the electronic apparatus 100 and transmit the preprocessed user voice to the electronic apparatus 100. The electronic apparatus 100 may transmit the user voice received from the refrigerator 10 to the air-conditioner 40. The air-conditioner 40 may convert the user voice received from the electronic apparatus 100 into text and transmit information on the text converted from the user voice to the electronic apparatus 100. The electronic apparatus 100 may transmit the text information received from the air-conditioner 40 to the plurality of servers 200-1, 200-2, . . . , 200-n. The plurality of servers 200-1, 200-2, . . . , 200-n grasp the intent and the entity of the user voice from the text and transmit response information on the user voice based on a result of natural language understanding.

In the above example, the electronic apparatus 100 is described to be implemented as a television but the electronic apparatus 100 may be implemented as various types of devices.

Figure 1C:
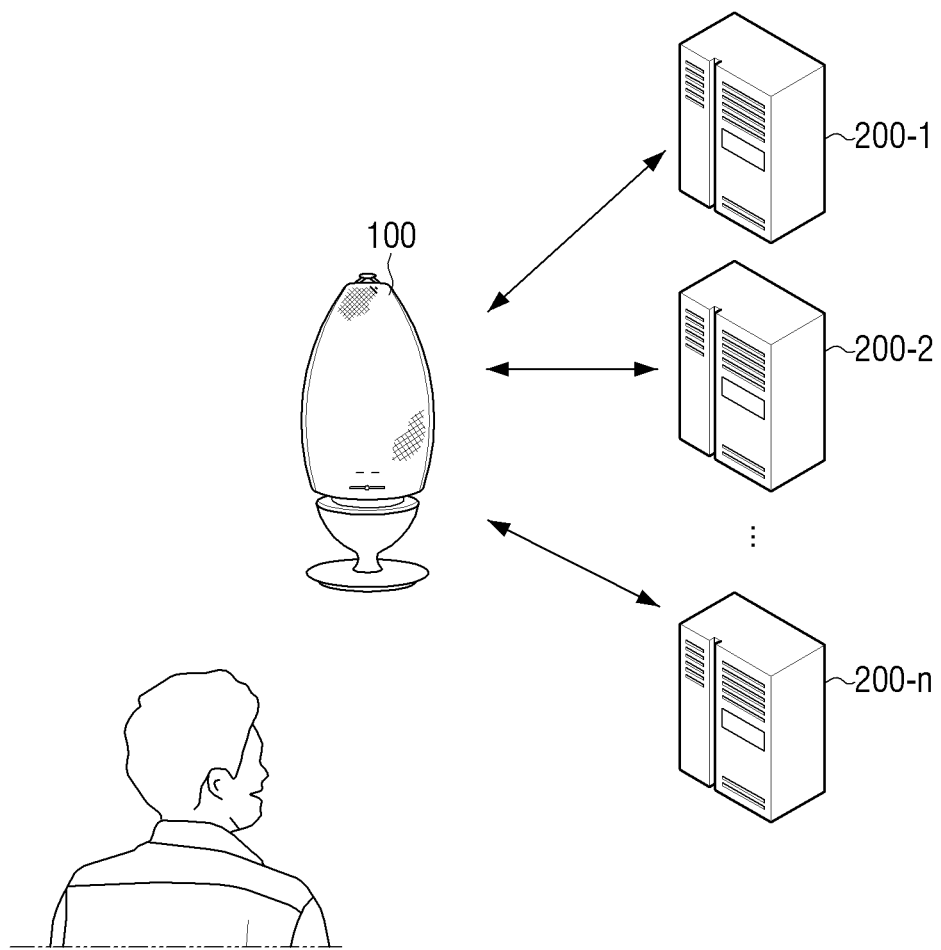
FIG. 1C is a view illustrating a system for providing an assistant service according to an embodiment of the disclosure.

Referring to FIG. 1C, the electronic apparatus may be implemented as a speaker 100 having a microphone. In this case, the speaker 100 may acquire a user voice through the microphone and transmit the acquired user voice to the plurality of servers 200-1, 200-2, . . . , 200-n. The speaker 100 may convert response information received from the plurality of servers 200-1, 200-2, . . . , 200-n into voice and output the voice.

Meanwhile, the response information may be provided by an electronic apparatus (not shown) other than the electronic apparatus 100.

Figure 1D:
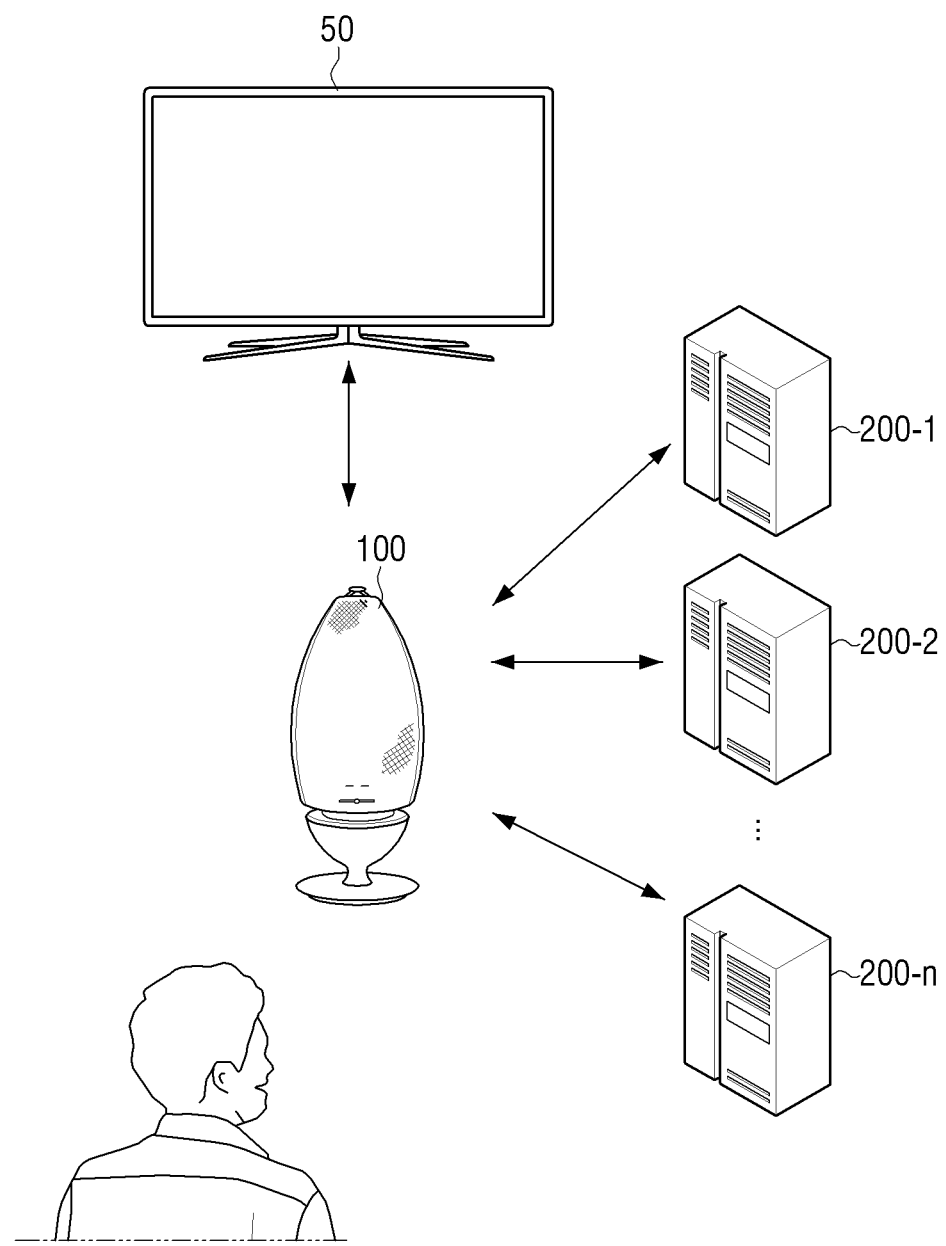
FIG. 1D is a view illustrating a system for providing an assistant service according to an embodiment of the disclosure.

FIG. 1D is a view illustrating a system for providing an assistant service according to an embodiment of the disclosure.

For example, it is assumed that the electronic apparatus is implemented as a speaker 100 having a microphone as shown in FIG. 1D.

Referring to FIG. 1D, the speaker 100 may receive a user voice through the microphone and transmit the information on the user voice to the plurality of servers 200-1, 200-2, . . . , 200-n. Accordingly, the plurality of servers 200-1, 200-2, . . . , 200-n may generate response information on the user voice and transmit the generated response information to the speaker 100. In this case, the speaker 100 transmits the response information to a television 50 including a display (not shown), and the television 50 may display a user interface including text included in the response information received from the speaker 100 through the display of the television 50.

The plurality of servers 200-1, 200-2, . . . , 200-n may be servers that provide different assistant services.

Recently, various companies have provided assistant services such as Samsung Bixby. As such, there are various assistant services and, according to an embodiment of the disclosure, a server may be a server operated by each company to provide an assistant service.

Currently provided assistant services may have domains (e.g., question/answer, device control, etc.) whose excellent performance is different. Therefore, if the user may use an assistant service that may provide a more accurate response, satisfaction and convenience of the user using the assistant service may be improved.

Accordingly, the electronic apparatus 100 according to an embodiment of the disclosure acquires response information from the plurality of servers 200-1, 200-2, . . . , 200-n and provides the user with the response information. This will be described in more detail below.

Figure 2A:
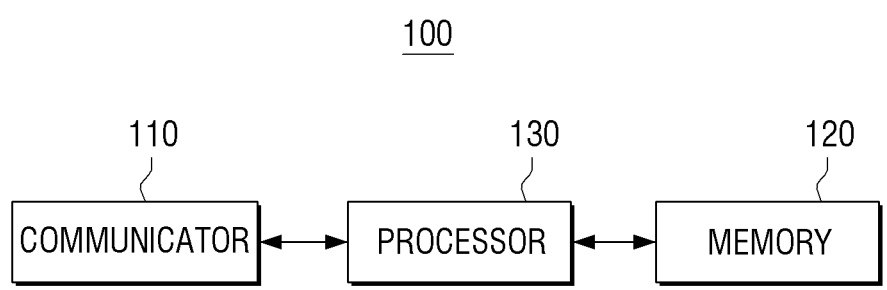
FIG. 2A is a block diagram illustrating a configuration of an electronic apparatus according to an embodiment of the disclosure.
Figure 2B:
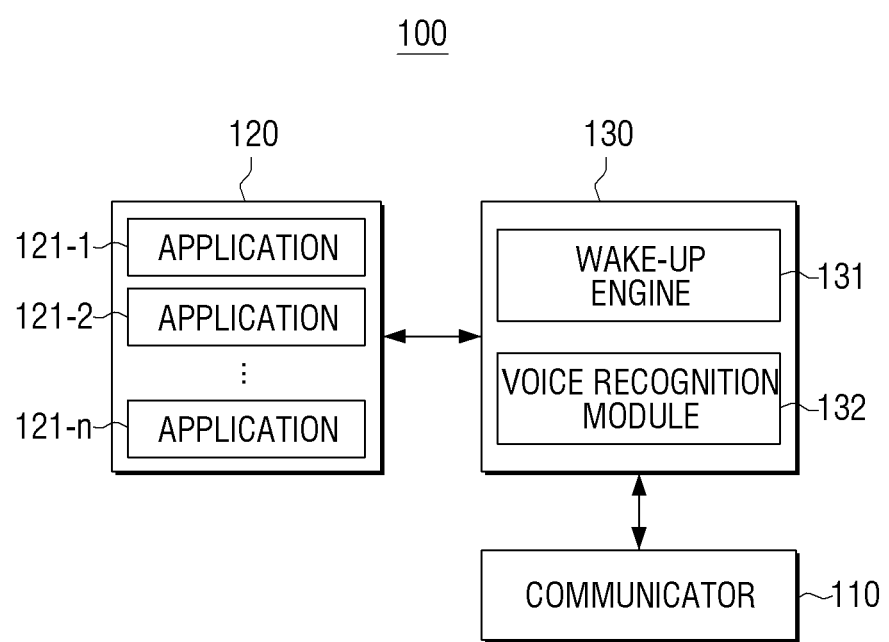
FIG. 2B is a block diagram illustrating a configuration of an electronic apparatus according to an embodiment of the disclosure.

FIG. 2A is a block diagram illustrating a configuration of an electronic apparatus according to an embodiment of the disclosure, and FIG. 2B is a block diagram illustrating a configuration of an electronic apparatus according to an embodiment of the disclosure.

Referring to FIG. 2A, the electronic apparatus 100 may include a communicator 110, a memory 120, and a processor 130.

The communicator 110 may communicate with various types of external devices. For example, the communicator 110 may communicate with an external electronic apparatus or server. In this case, the communicator 110 may use various types of short-range communication such as Wi-Fi, Bluetooth, near-field communication (NFC), or the like or may use various types of remote communication such as wireless mobile communication, Ethernet, or the like. To this end, the communicator 110 may include at least one of a Wi-Fi chip, an Ethernet chip, a Bluetooth chip, a wireless mobile communication chip, an NFC chip.

The server may include a server capable of providing an assistant service using a trained AI model.

In this case, the communicator 110 may transmit information on a user voice acquired by the electronic apparatus 100 to the server, and receive response information corresponding to the user voice acquired through the AI model from the server. The information on the user voice may be at least one of a voice file, a compressed voice file, a preprocessed user voice, and feature point information extracted from the user voice.

The memory 120 may store commands or data related to at least one other element of the electronic apparatus 100. In particular, the memory 120 may store at least one command related to execution of the assistant service.

The processor 130 may be connected to the communicator 110 and the memory 120 to control the electronic apparatus 100. The processor 130 may be electrically connected to the communicator 110 and the memory 120 and control overall operations and functions of the electronic apparatus 100.

When the processor 130 receives a user input for executing the assistant service by executing at least one command stored in the memory 120, the processor 130 may transmit information on the user voice acquired by the electronic apparatus 100 to the plurality of servers 200-1, 200-2, . . . , 200-n providing different assistant services through the communicator 110, and thereafter, when a plurality of response information are received from the plurality of servers 200-1, 200-2, . . . , 200-n, the processor may provide a response on the user voice based on at least one of the plurality of received response information.

A case where the user input for executing the assistant service is received may include a case where a user voice including a wakeup word (or a wakeup command) is input or a case where a user input based on selection of a predetermined button is input.

In this case, the wakeup word refers to a trigger word for executing the assistant service or requesting a response of the assistant service, and the user must utter a wakeup word corresponding to a voice call command to use the assistant service in the electronic apparatus 100. This wakeup word may be determined based on the assistant service. For example, the wakeup word may include a name of an AI used in each company for assistant services. Thus, the wakeup word may be different depending on types of assistant services.

In addition, the wakeup word may be changed according to a user input. The user may access a server through the electronic apparatus 100 or another electronic apparatus (not shown) and change the wakeup word. For example, the user may request to change a wakeup word "Hi Bixby" to "hello Bixby" and the server may register the wakeup word changed according to the user input. However, if all or a part of a new wakeup word input by the user for change is the same as all or a part of a wakeup word of an assistant service provided by another server, the server may reject the user's request for the change and may not change the wakeup word.

The user voice may be input through a microphone (not shown) provided in the electronic apparatus 100 or an external electronic apparatus (not shown) connected to the electronic apparatus 100 may receive a user voice and transmit the received user input to the electronic apparatus 100.

The predetermined button may be provided in the electronic apparatus 100 or in an external electronic apparatus (not shown) connected to the electronic apparatus 100. In this case, when the predetermined button is selected, the external electronic apparatus (not shown) may transmit a signal indicating that the predetermined button is selected to the electronic apparatus 100.

FIG. 2B is a block diagram illustrating a configuration of an electronic apparatus according to an embodiment of the disclosure.

Referring to FIG. 2B, hereinafter, a method of providing a response on a user voice through the plurality of assistant services will be described in detail.

First, a case where a user voice including a specific wakeup word is input as a user input for executing an assistant service according to an embodiment of the disclosure will be described.

When a user input for executing a first assistant service is received, the processor 130 may transmit information on the user voice to a first server providing the first assistant service and a second server providing a second assistant service and transmit a response on the user voice based on the response information received from the first server among the plurality of response information received from the first and second servers.

When a first wakeup word for executing the first assistant service is identified in a first user voice acquired by the electronic apparatus 100, the processor 130 may transmit information on the first user voice to the first server providing the first assistant service and the second server providing the second assistant service, and provide a response on the first user voice based on the response information received from the first server among the plurality of response information received from the first server and the second server based on the transmission of the information on the first user voice.

The processor 130 may determine whether a wakeup word is present in the user voice using a wakeup engine 131. The wakeup engine 131 may include an AI model trained to recognize various wakeup words, in which case the wakeup word may be additionally designated or changed. In FIG. 2B, it is described that the wakeup engine 131 and a voice recognition module 132 are implemented in hardware, but they may be implemented in software, and in this case, may be stored in the memory 120.

The processor 130 may store the input user voice in the memory 120, perform voice recognition on the user voice of a predetermined interval through the wakeup engine 131, and determine whether a wakeup word is present in the user voice.

The wakeup word is a wakeup word for executing any one of a plurality of assistant services provided by the plurality of servers 200-1, 200-2, . . . , 200-*n*.

Accordingly, when the wakeup word is present in the user voice, the processor 130 may transmit the information on the user voice to the plurality of servers 200-1, 200-2, . . . , 200-*n* through the communicator 110.

The processor 130 may acquire information on the user voice from the user voice acquired by the electronic apparatus 100.

The processor 130 may generate a voice file or a compressed voice file for the user voice or perform preprocessing on the user voice, and generate a voice file or compressed voice file for the preprocessed user voice. In addition, the processor 130 may extract feature points from the user voice and acquire information on the user voice.

The processor 130 may transmit the information on the user voice excluding the wakeup word from the user voice to the plurality of servers 200-1, 200-2, . . . , 200-*n*. For example, the processor 130 may transmit information on the user voice present after the wakeup word to the plurality of servers 200-1, 200-2, . . . , 200-*n*.

To this end, the processor 130 may execute (or launch or activate) applications 121-1, 121-2, . . . , 121-*n* stored in the memory 120.

The applications 121-1, 121-2, . . . , 121-*n*, as programs for providing an assistant service function by interworking with each of the plurality of servers 200-1, 200-2, . . . , 200-*n*, may transmit and receive various types of information for providing the assistant service to and from the plurality of servers 200-1, 200-2, . . . , 200-*n* and provide a response on a user voice.

These applications 121-1, 121-2, . . . , and 121-*n* may be downloaded through the plurality of servers 200-1, 200-2, . . . , 200-*n* or through a separate application store and installed in the electronic apparatus 100 or the electronic apparatus 100 may access the plurality of servers 200-1, 200-2, . . . , 200-*n* to use a corresponding function according to a cloud service method.

In this case, the processor 130 may execute all other applications 121-2, . . . , 121-*n*, as well as the application 121-1 for providing the assistant service corresponding to the wakeup word, and transmit the information on the user voice to the plurality of servers 200-1, 200-2, . . . , 200-*n* through the applications 121-1, 121-2, . . . , 121-*n*.

Even if a wakeup word for executing a specific assistant service is input, the processor 130 may provide the information on the user voice not only to the server 200-1 providing a specific assistant service but also the servers 200-2, . . . , 200-*n* different from the corresponding server.

The plurality of servers 200-1, 200-2, . . . , 200-*n* may generate response information on the user voice based on the information on the user voice received from the electronic apparatus 100 and transmit the response information to the electronic apparatus 100.

When the response information on the user voice is received from the plurality of servers 200-1, 200-2, . . . , 200-*n*, the processor 130 may provide a response on the user voice based on the response information generated by the assistant service corresponding to the wakeup word among a plurality of response information.

When the user speaks the wakeup word indicating the specific assistant service requests a response of the corresponding assistant service, the processor 130 may provide the response on the user voice based on the response information received from the server providing the assistant service matched to the wakeup word among the plurality of received response information. In this case, the processor 130 may store other response information in the memory 120.

The processor 130 may determine whether a second user voice acquired after the first user voice corresponds to a voice requesting a response result of another assistant service regarding the first user voice.

The processor 130 may determine whether the user voice corresponds to a voice requesting a response result of the other assistant service using the voice recognition module 132.

The voice recognition module 132 may convert the user voice into text by performing voice recognition on the user voice and recognize whether an intent of the user voice requests a response result of the other service based on a voice recognition result. In this case, the speech recognition module 132 may include an AI model trained to determine whether the user voice requests a response result of the other assistant service through natural language understanding.

The processor 130 may perform recognition on the user voice only in a state where the applications 121-1, 121-2, . . . , 121-*n* are executed, and determine whether the corresponding user voice has an intent of requesting a response result of another assistance service.

Accordingly, when the second user voice does not correspond to a voice requesting a response result of the second assistant service regarding the first user voice, the processor 130 may transmit information on the second user voice to the first server and the second server, and provide a response on the second user voice based on the response information received from the first server among the plurality of response information received from the first server and the second server based on transmission of the second user voice.

When the user utters a voice having a different intent without requesting information provided by another assistant service, the processor 130 provides a response on the user voice afterwards by continuously using the assistant service which has previously provided a response. However, even in this case, the processor 130 also transmits information on the user voice acquired afterwards to the plurality of servers in that a response provided by another assistant service may be requested for a user voice that the user utters afterwards.

When the second user voice corresponds to a voice requesting a response result of the second assistant service for the first user voice, the processor 130 may provide a response on the second user voice based on response information received from the second server providing the second assistant service among a plurality of response information received based on the transmission of the information on the first user voice.

When the user utters a voice requesting information provided by another assistant service with respect to a previous user voice, the processor 130 may provide a response on the user voice based on response information received from a server providing an assistant service requested by the user among a plurality of response information received for the previous user voice.

Meanwhile, when the assistant service is changed according to a user's request, the processor 130 may provide a response on a user voice afterwards using the changed assistant service. The processor 130 may provide a response on the user voice by using the changed assistant service until a user voice requesting a change to another assistant service is input again, and when a user voice requesting a change to another assistant service is input, the processor may provide a response on the user voice using the assistant service requested by the user.

As described above, according to an embodiment of the disclosure, when information on a user voice is transmitted to the plurality of servers and a response on the user voice is provided using a plurality of response information received from the plurality of servers, a plurality of assistant services may be provided to the user seamlessly, and in that the user may be provided with responses from various assistant services, satisfaction and convenience of the user who uses the assistant service may be enhanced.

FIGS. 3, 4, 5, 6, 7A, 7B, 8, 9 and 10A, 10B and 10C are views illustrating a method of providing a response on a user voice according to various embodiments of the disclosure.

Figure 3:
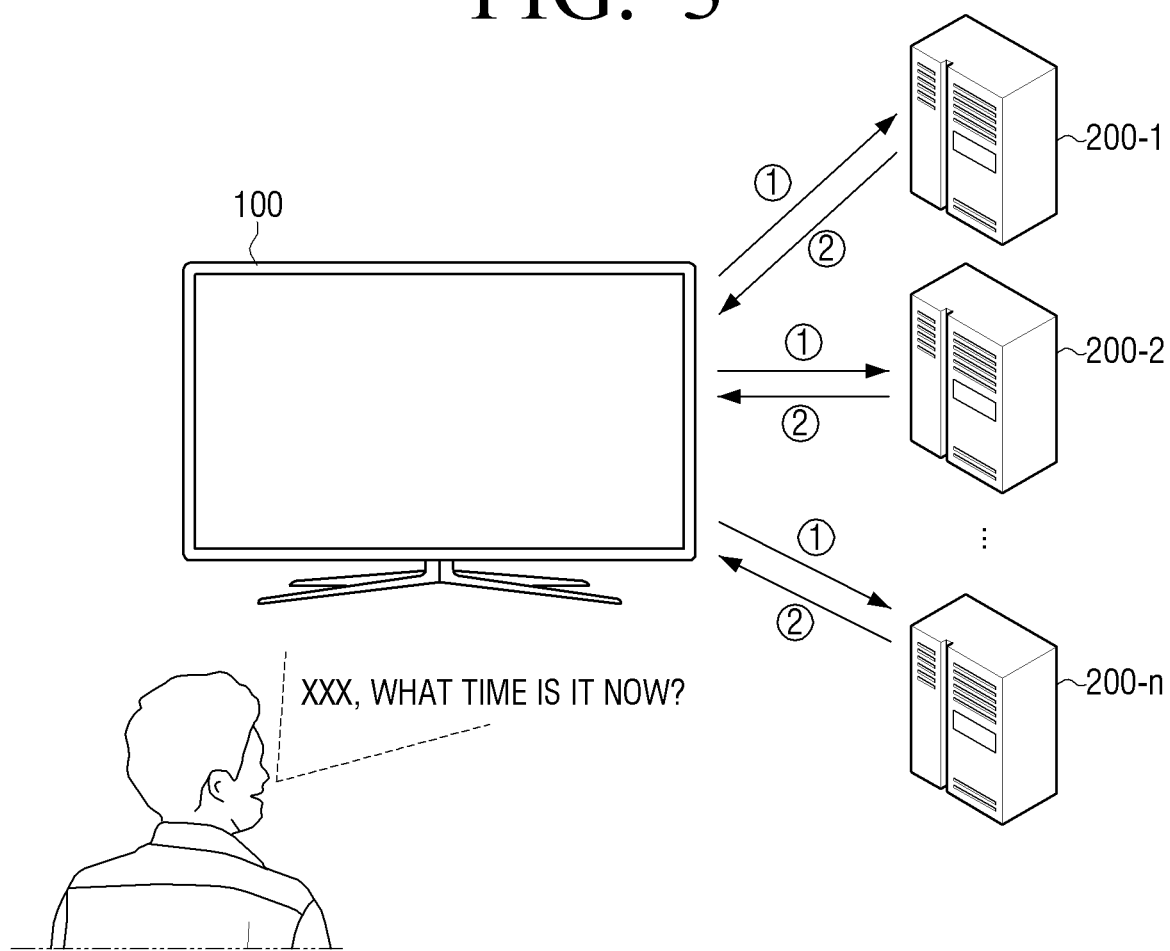
FIG. 3 is a view illustrating a method of providing an assistant service according to an embodiment of the disclosure.

FIG. 3 is a view illustrating a method of providing an assistant service according to an embodiment of the disclosure.

Referring to FIG. 3, it is assumed that the user utters "XXX, what time is it now?" Here, XXX may be a wakeup word for an assistant service provided by the first server 200-1.

In this case, as shown in ① of FIG. 3, the processor 130 may execute the applications 121-1, 121-2, . . . , 121-n and transmit information on the "What time is it now?" which is the user voice excluding the wakeup word to the plurality of servers 200-1, 200-2, . . . , 200-n through the applications 121-1, 121-2, . . . , 121-n.

Accordingly, as shown in ② of FIG. 3, the plurality of servers 200-1, 200-2, . . . , 200-n may generate response information to "What time is it now" received from the electronic apparatus 100 and transmit the generated response information to the electronic apparatus 100.

For example, the first server 200-1 may transmit "It's 9 o'clock in the morning" as response information to the electronic apparatus 100, and the second server 200-2 may transmit "May I tell you in Korean time?" as response information to the electronic apparatus 100, and the n-th server 200-n may transmit "It's 9 o'clock" as the response information to the electronic apparatus 100.

Figure 4:
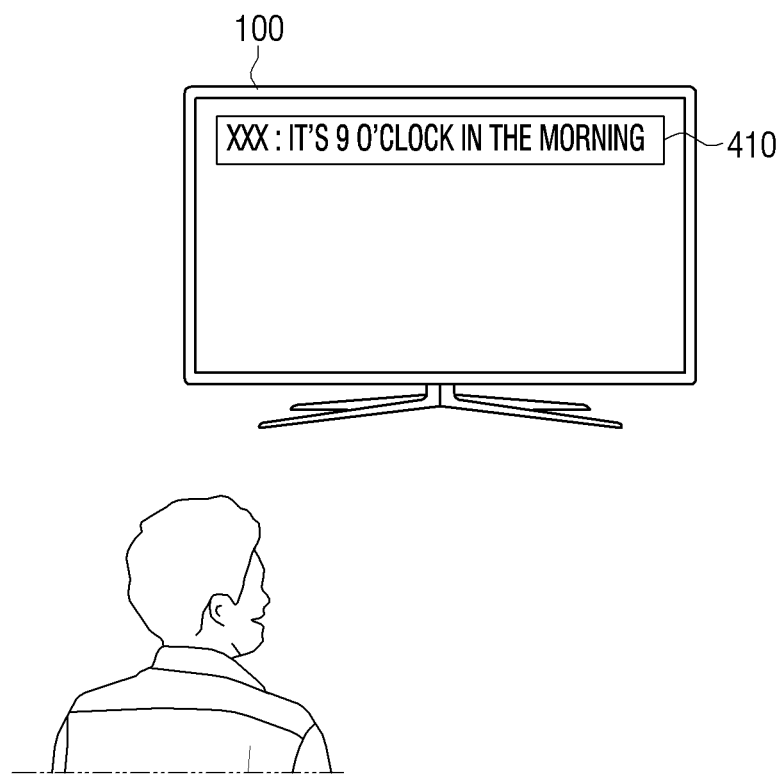
FIG. 4 is a view illustrating a method of providing an assistant service according to an embodiment of the disclosure.

FIG. 4 is a view illustrating a method of providing an assistant service according to an embodiment of the disclosure.

Referring to FIG. 4, in this case, in that the assistant service (or voice assistant) called by the user is XXX, the processor 130 may display a screen including "It's 9 o'clock in the morning" 410 on a display of the electronic apparatus 100 based on the response information received from the first server 200-1.

Figure 5:
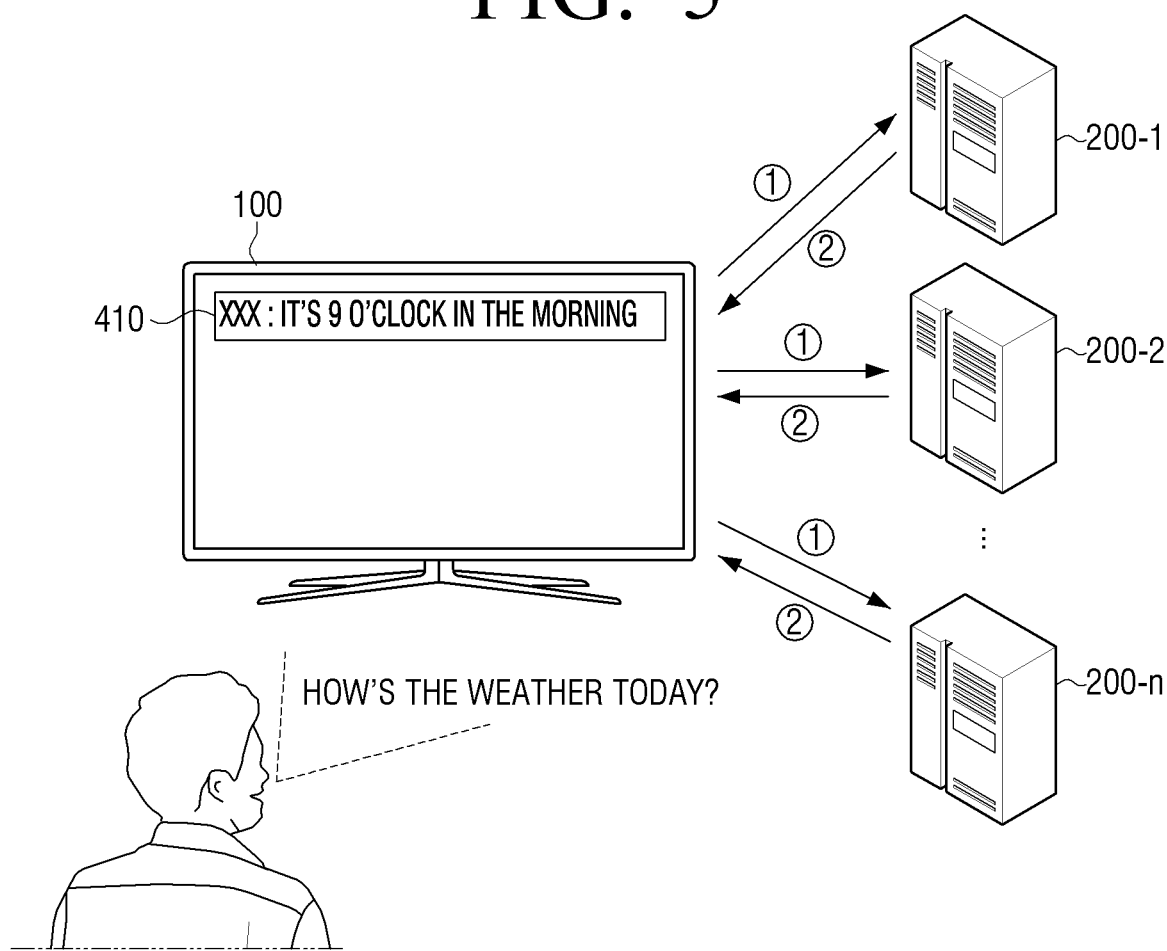
FIG. 5 is a view illustrating a method of providing an assistant service according to an embodiment of the disclosure.

FIG. 5 is a view illustrating a method of providing an assistant service according to an embodiment of the disclosure.

Referring to FIG. 5, it is assumed that the user utters "How's the weather today?".

In this case, the processor 130 determines that "How's the weather today" corresponds to a voice requesting a response result of another assistant service in that the applications 121-1, 121-2, . . . , 121-n are executed. Because "How's the weather today" does not correspond to a voice requesting a response result of another assistant service, the processor 130 may transmit the information on "How's the weather today" which is the user voice to the plurality of servers 200-1, 200-2, . . . , 200-n as shown in ① of FIG. 5.

Accordingly, as shown in ② of FIG. 5, the plurality of servers 200-1, 200-2, . . . , 200-n generates response information to "How's the weather today" received from the electronic apparatus 100 and transmits the generated response information to the electronic apparatus 100.

For example, the first server 200-1 may transmit "it will rain a bit today" as response information to the electronic apparatus 100, the second server 200-2 may transmit "Chance of rain today is 60 percent" as response information to the electronic apparatus 100, and the n-th server 200-n may transmit "For today, weather will be nice but rain is likely between 6 and 7 p.m." as response information to the electronic apparatus 100.

Figure 6:
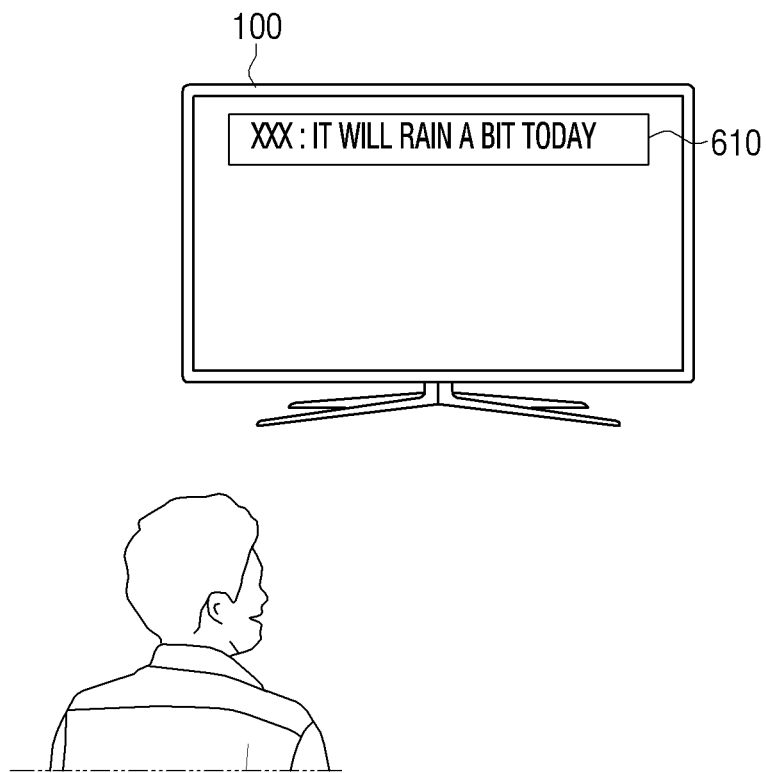
FIG. 6 is a view illustrating a method of providing an assistant service according to an embodiment of the disclosure.

FIG. 6 is a view illustrating a method of providing an assistant service according to an embodiment of the disclosure.

Referring to FIG. 6, in this case, in that the response is provided through the XXX assistant service for the previous user voice, the processor 130 may display a screen including "It will rain a bit today" 610 on the display of the electronic apparatus 100 based on the response information received from the first server 200-1.

Figure 7A:
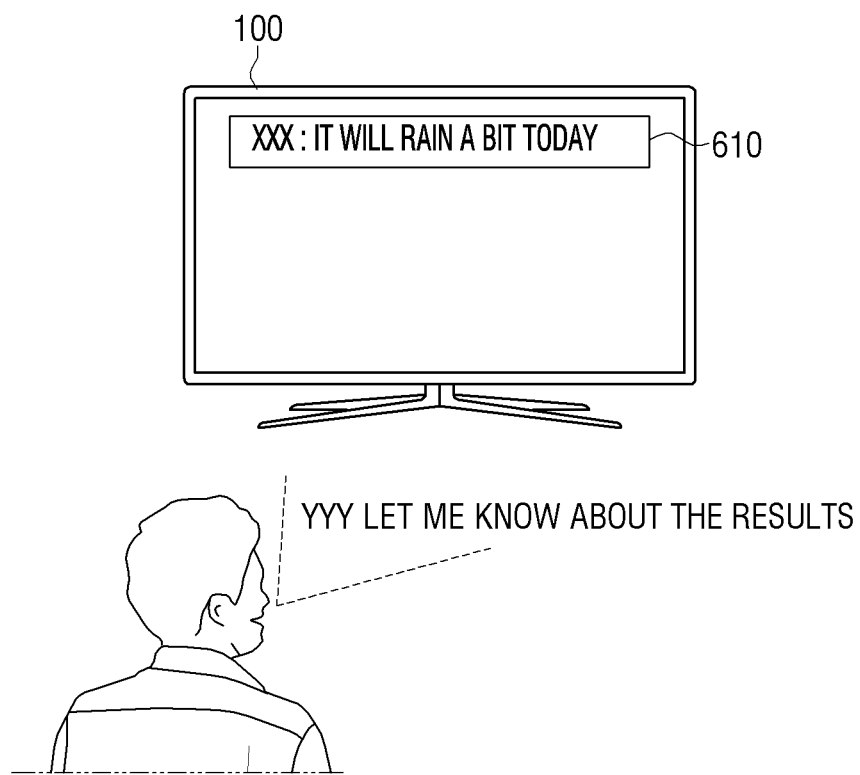
FIGS. 7A and 7B is a view illustrating a method of providing an assistant service according to various embodiments of the disclosure.
Figure 7B:
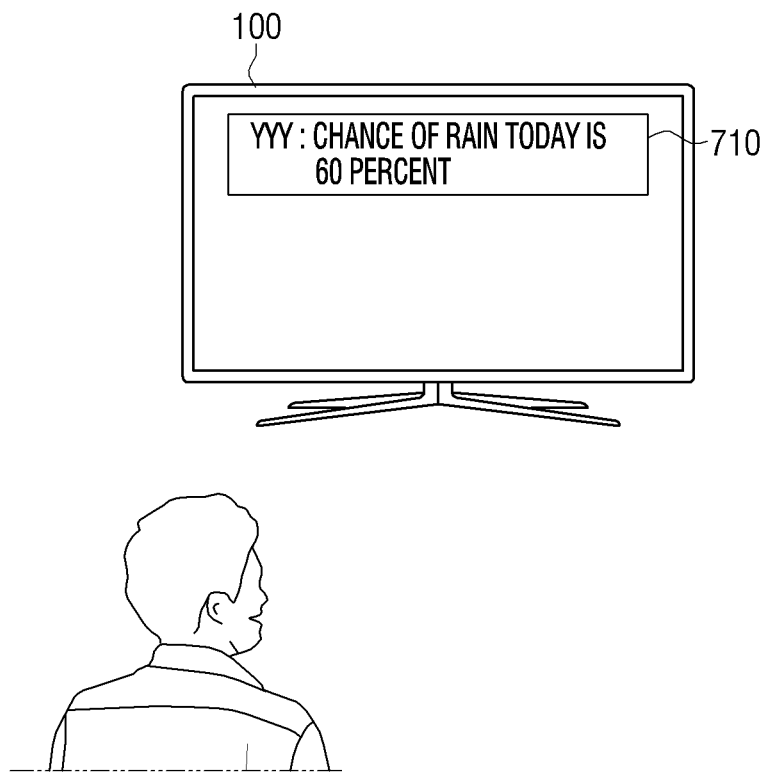

FIGS. 7A and 7B is a view illustrating a method of providing an assistant service according to various embodiments of the disclosure.

Referring to FIG. 7A, subsequently, when the user utters "YYY, let me know about the result", the processor 130 may determine whether "YYY, let me know about the result" corresponds to a voice requesting a response result of another assistant service in that the applications 121-1, 121-2, . . . , 121-n are executed. Here, YYY may be a wakeup word for the assistant service provided by the second server 200-2.

Referring to FIG. 7B, since "YYY, let me know about the result" corresponds to a voice requesting a response result of the assistant service YYY, the processor 130 may display a screen including "Chance of rain today is 60 percent" 710 on the display of the electronic apparatus 100 based on the response information on "How's the weather today?" previously received from the second server 200-2 as shown in FIG. 7B.

Figure 8:
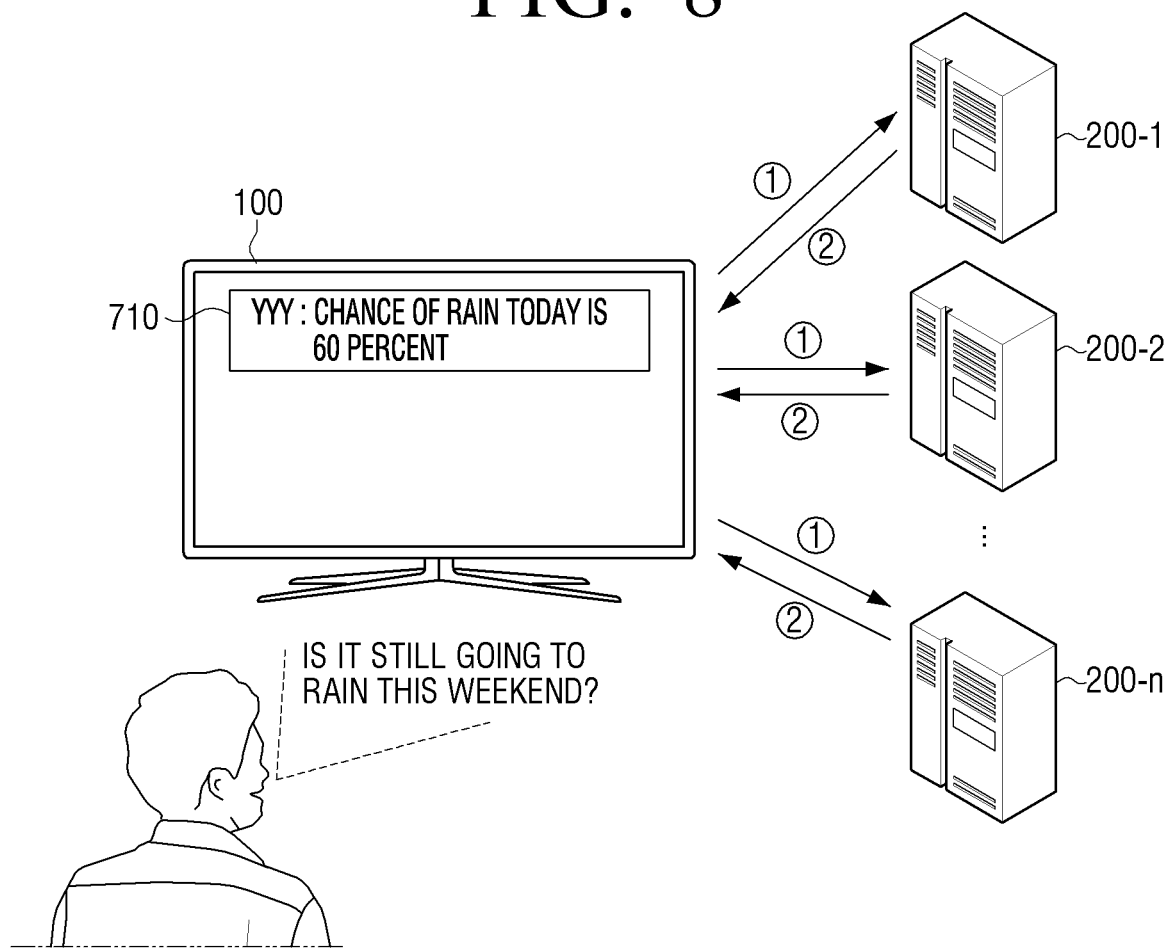
FIG. 8 is a view illustrating a method of providing an assistant service according to an embodiment of the disclosure.

FIG. 8 is a view illustrating a method of providing an assistant service according to an embodiment of the disclosure.

Referring to FIG. 8, it is assumed that the user utters "Is it still going to rain this weekend?".

In this case, the processor 130 may determine that "Is it still going to rain this weekend?" corresponds to a voice requesting a response result of another assistant service in that applications 111-1, 111-2, . . . , 111-n are executed. Because "Is it still going to rain this weekend?" does not correspond to a voice requesting a response result of another assistant service, the processor 130 may transmit information on the "Is it still going to rain this weekend?" which is a user voice to the plurality of servers 200-1, 200-2, . . . , 200-n as shown in ① of FIG. 8.

Accordingly, as shown in ② of FIG. 8, the plurality of servers 200-1, 200-2, . . . , 200-n may generate response information on "Is it still going to rain this weekend?" received from the electronic apparatus 100 and transmit the generated response information to the electronic apparatus 100.

Figure 9:
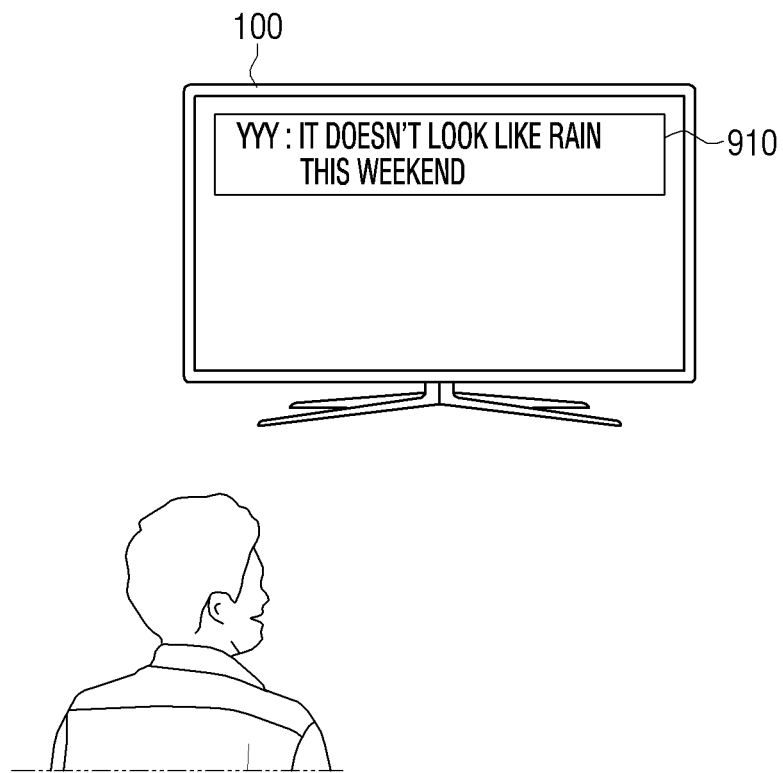
FIG. 9 is a view illustrating a method of providing an assistant service according to an embodiment of the disclosure.

FIG. 9 is a view illustrating a method of providing an assistant service according to an embodiment of the disclosure.

Referring to FIG. 9, in this case, because the assistant service previously called by the user is YYY, the processor 130 may display a screen including "It doesn't look like rain this weekend" 910 on the display of the electronic apparatus 100 based on the response information received from the second server 200-2.

In the example described above, the processor 130 may provide a user interface indicating that a response from another assistant service may be provided.

When providing the response of the assistant service called by the user, the processor 130 may display a name of an assistant service other than the assistant service called by the user together with the response of the assistant service called by the user to inform the user that a response of another assistant service may also be provided.

Figure 10A:
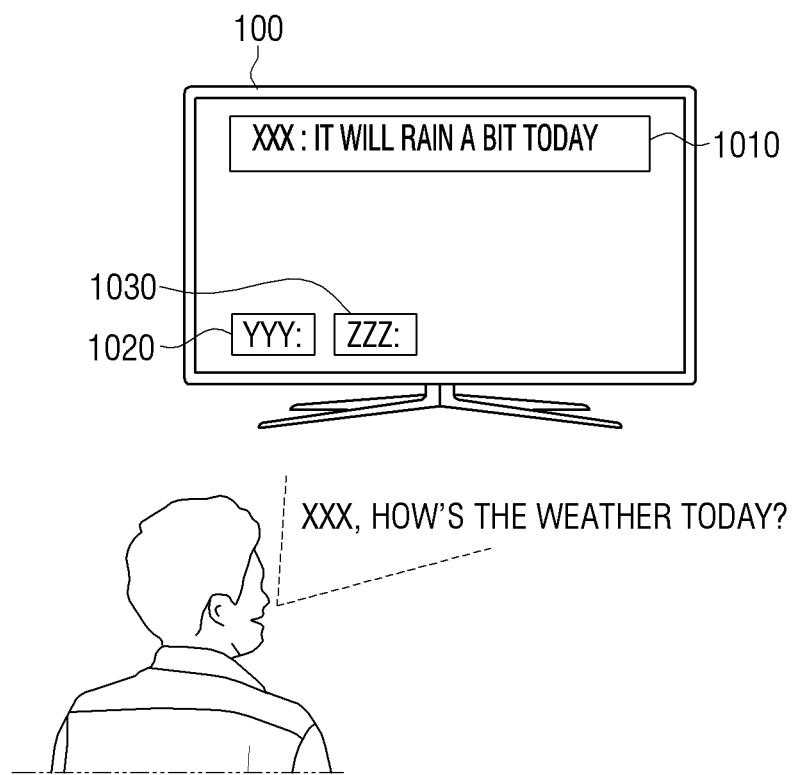
FIGS. 10A, 10B, and 10C are views illustrating a method of providing an assistant service according to various embodiments of the disclosure.
Figure 10B:
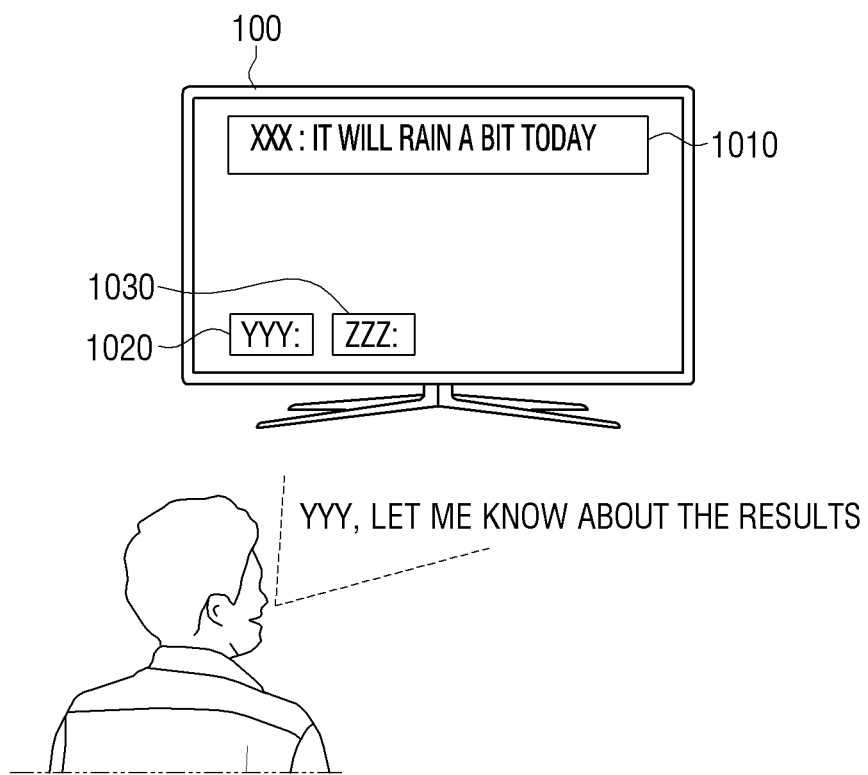
Figure 10C:
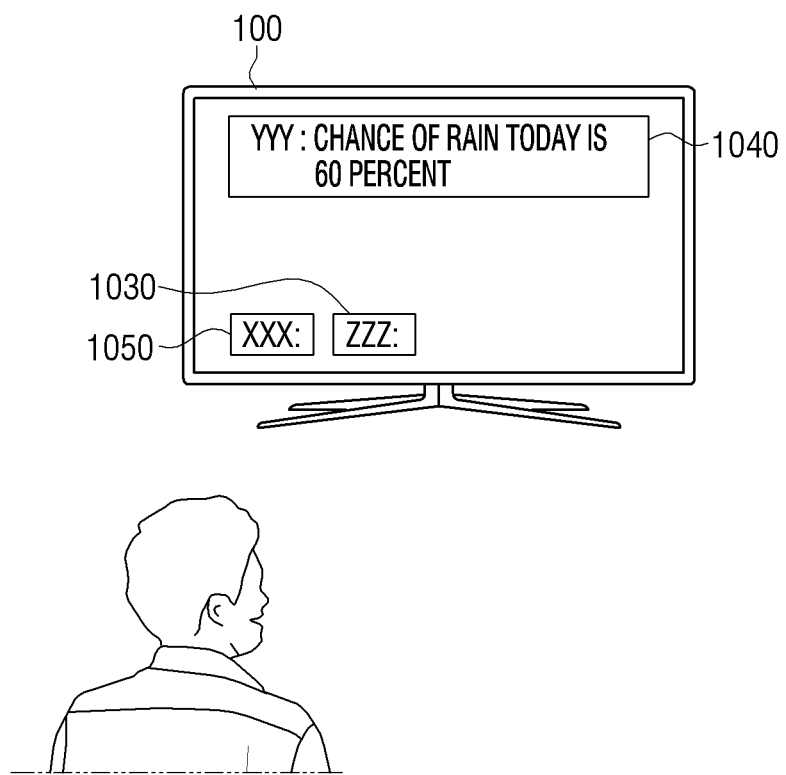

FIGS. 10A, 10B, and 10C are views illustrating a method of providing an assistant service according to various embodiments of the disclosure.

Referring to FIG. 10A, when the user utters "XXX, how's the weather today?", the processor 130 may display "It will rain a bit today" 1010 on the display based on response information provided by the assistant service XXX. In this case, the processor 130 may display YYY 1020 and ZZZ 1030 which are names of other assistant services on the display.

Referring to FIGS. 10B and 10C, Thereafter, when the user utters "YYY, let me know also about the result" as shown in FIG. 10B, the processor 130 may display "Chance of rain today is 60 percent" 1040 on the display as shown in FIG. 10C based on the response information received from the server providing the assistant service YYY. In this case, the processor 130 may display XXX 1050 and ZZZ 1030, which are the names of the other assistant services, on the display.

A case where a user input for selecting a predetermined button is input as a user input to execute an assistant service will be described.

When a user voice is acquired after a user input based on selection of a predetermined button is received, the processor 130 may transmit the information on the user voice to the plurality of servers 200-1, 200-2, . . . , 200-n.

The predetermined button is a button for triggering an assistant service. When the predetermined button is selected, the processor 130 may execute the applications 121-1, 121-2, . . . , 121-n stored in the memory 120 and transmit information on a user voice input afterwards to the plurality of servers 200-1, 200-2, . . . , 200 through the applications 121-1, 121-2, . . . , 121-n.

The predetermined button may be provided in the electronic apparatus 100 or in an external electronic apparatus (not shown) connected to the electronic apparatus 100. In this case, when the predetermined button is pressed, the external electronic apparatus may transmit a signal indicating that the predetermined button was pressed to the electronic apparatus 100.

The plurality of servers 200-1, 200-2, . . . , 200-n generate response information regarding the user voice received from the electronic apparatus 100 and transmit the response information to the electronic apparatus 100.

When the response information for the user voice is received from the plurality of servers 200-1, 200-2, . . . , 200-n, the processor 130 may provide a plurality of responses for the user voice based on the plurality of response information.

When the user does not request a response by specifying an assistant service as if the user uttered a specific wakeup word, the processor 130 may provide a response on the user voice based on the plurality of response information provided from the plurality of assistant services.

In this case, the processor 130 may provide the plurality of responses in different forms based on at least one of a user preference for the plurality of assistant services provided by the plurality of servers and accuracy of the plurality of response information.

The processor 130 may display a response of the assistant service having the highest user preference to be the largest, display the response in a color different from those of other assistant services or highlight the response based on the user preference on the plurality of assistant services provided by the plurality of servers. Alternatively, the processor 130 may display a response of the assistant service having the highest user preference and display only names of other assistant services. The processor 130 may display the response of the assistant service in order of high user preference. When displaying the responses of the plurality of assistant services, the processor 130 may display them in order of user preference.

The processor 130 may store the information on the assistant service used by the user in the memory 120 and update the corresponding information every time the user uses the assistant service.

Accordingly, the processor 130 may determine that the user has a high preference in order of the assistant services, starting from an assistant service having the highest use frequency of the user.

The processor 130 may display a response of an assistant service that does not provide an accurate response to be smaller than a response of other assistant services, display only a name of the assistant service, or display only the name of the assistant service or only a portion of the response based on accuracy of the plurality of assistant services provided by the plurality of servers.

For example, in case where it is not possible to analyze a meaning of a user voice, the plurality of servers 200-1, 200-2, . . . , 200-*n* may not configure response information. In this case, the plurality of servers 200-1, 200-2, . . . , 200-*n* may transmit response information such as "the service is not supported" to the electronic apparatus 100.

The processor 130 may determine that the assistant service provided by the corresponding server does not provide an accurate response on the user voice, and may display the response of the assistant service to be differentiated from that of other assistant services.

After providing a plurality of responses, when a user voice is input, the processor 130 may determine whether a wakeup word is present in the user voice using the wakeup engine 131.

Accordingly, when the wakeup word is not present, the processor 130 may transmit the information on the user voice to the plurality of servers 200-1, 200-2, . . . , 200-*n* and provide a plurality of responses based on a plurality of response information received from the plurality of servers 200-1, 200-2, . . . , 200-*n*. In this case, the processor 130 may differentially display the plurality of responses as described above.

However, when the wakeup word is present, the processor 130 may transmit information on the remaining portion of the user voice excluding the wakeup word to the plurality of servers 200-1, 200-2, . . . , 200-*n*.

When the response information on the user voice is received from the plurality of servers 200-1, 200-2, . . . , 200-*n*, the processor 130 may provide a response on the user voice based on response information generated by the assistance service corresponding to the wakeup word among the plurality of response information.

After the user utters a wakeup word indicating a specific assistant service, responses of a plurality of assistant services are not provided but a response on the user voice may be provided based on response information received from a server providing the assistant service for which the user has requested a response, that is, the assistant service matched to the wakeup word. In this case, the processor 130 may store other response information in the memory 120, and thereafter, when a response result of the other assistant service is requested, the processor 130 may provide a response using the response information stored in the memory 120.

A specific operation of the processor 130 in case where the wakeup word is present in the voice uttered by the user is the same as described above, and thus a detailed description thereof will be omitted.

As described above, according to an embodiment of the disclosure, when the user requests execution of an assistant service without specifying a specific assistant service, responses of a plurality of assistant services for the user voice are provided, and thereafter, the response of the assistant service selected by the user may be provided, and in this sense, satisfaction and convenience of the user who uses the assistant service may be improved.

FIGS. 11, 12, 13, 14, 15, 16, 17A, 17B, and 17C are views illustrating a method of providing a response on a user voice according to various embodiments of the disclosure.

Figure 11:
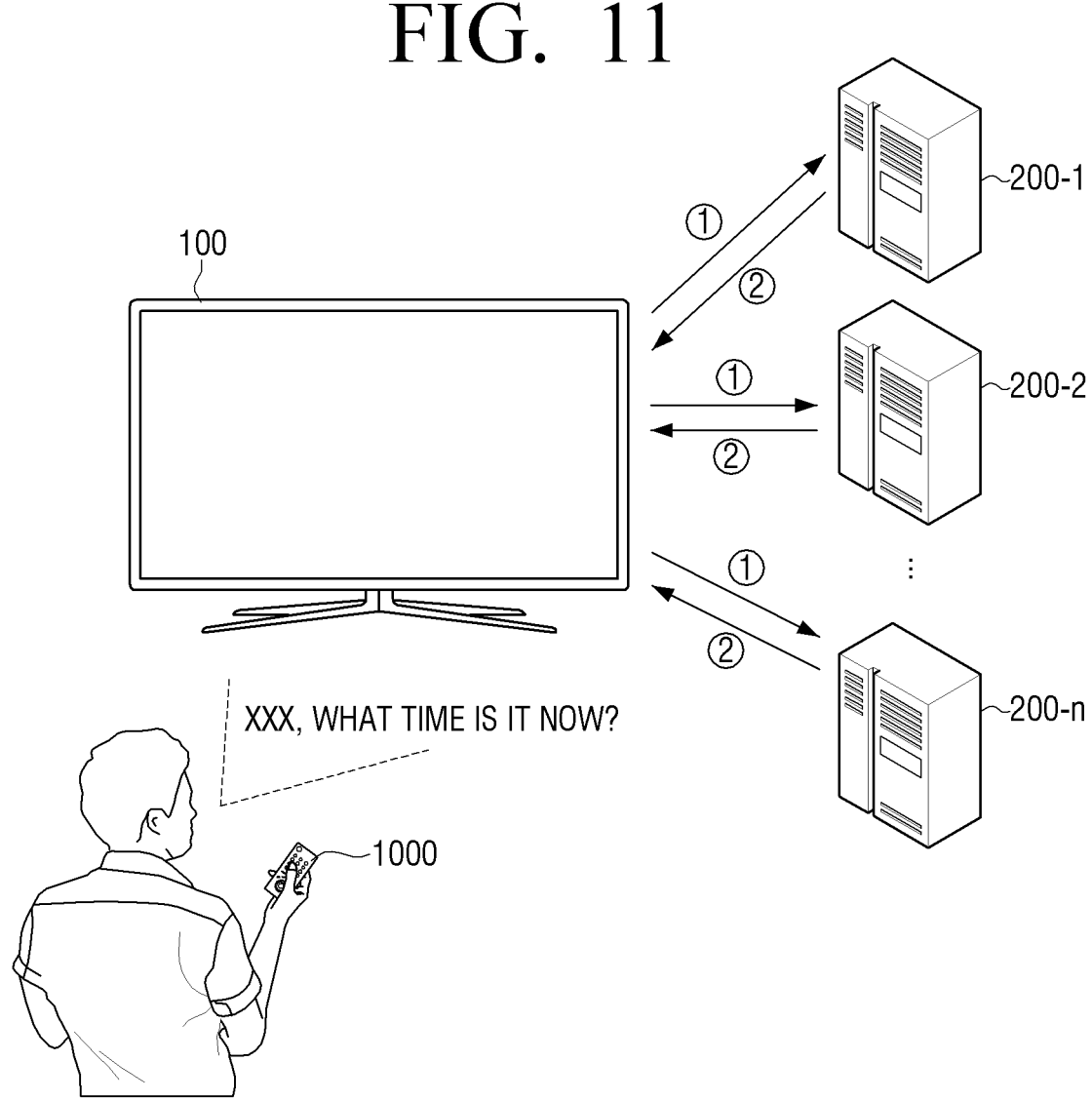
FIG. 11 is a view illustrating a method of providing an assistant service according to an embodiment of the disclosure.

FIG. 11 is a view illustrating a method of providing an assistant service according to an embodiment of the disclosure.

Referring to FIG. 11, first, it is assumed that the user presses a button provided in a remote controller 1000 and then utters "What time is it now." In this case, the remote controller 1000 may transmit a signal indicating that the button is pressed to the electronic apparatus 100, and the processor 130 may determine that a user input for executing an assistant service is input based on the received signal.

Accordingly, as indicated by ① of FIG. 11, the processor 130 may execute the applications 121-1, 121-2, . . . , 121-*n* and transmit information on "What time is it now?" which is the acquired user voice to the plurality of servers 200-1, 200-2, . . . , 200-*n* through the applications 121-1, 121-2, . . . , 121-*n*.

As indicated by ② of FIG. 11, the plurality of servers 200-1, 200-2, . . . , 200-*n* may generate response information on "What time is it now?" received from the electronic apparatus 100 and transmit the generated response information to the electronic apparatus 100.

The processor 130 may display a plurality of responses regarding "What time is it now?" on the display of the electronic apparatus 100 based on a plurality of response information received from the plurality of servers 200-1, 200-2, . . . , 200-*n*.

Figure 12:
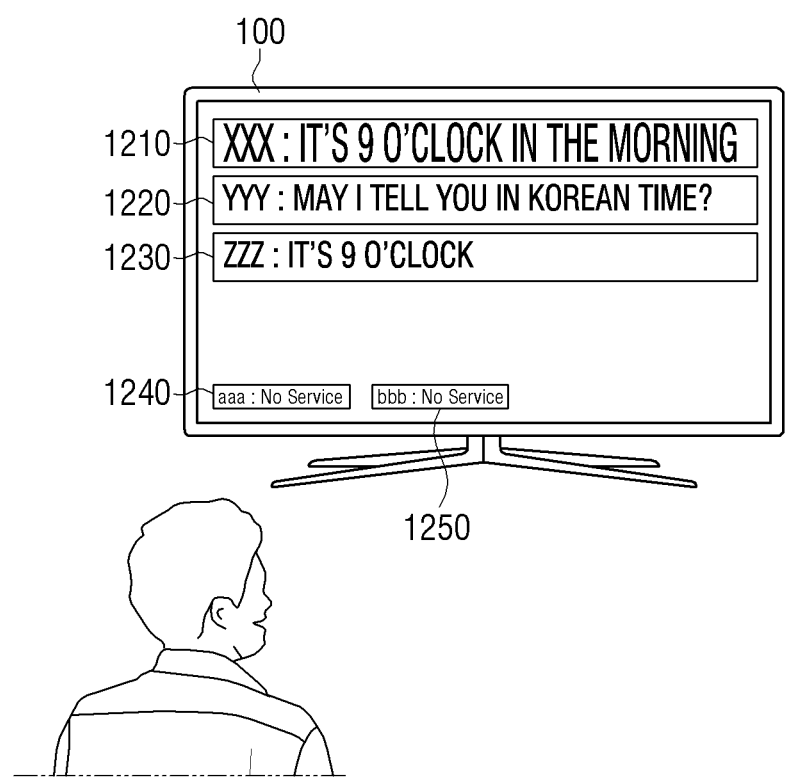
FIG. 12 is a view illustrating a method of providing an assistant service according to an embodiment of the disclosure.

FIG. 12 is a view illustrating a method of providing an assistant service according to an embodiment of the disclosure.

Referring to FIG. 12, the processor 130 may display "It's 9 o'clock in the morning" 1210 based on the response information of XXX having high user preference to have a size larger than "May I tell you in Korean time?" 1220 and "It's 9 o'clock" 1230 based on response information of YYY and ZZZ. In addition, the processor 130 may provide "No service" 1240, 1250 as responses of aaa and bbb which do not form response information but may display the responses to be smaller than the responses of the other assistant services.

Figure 13:
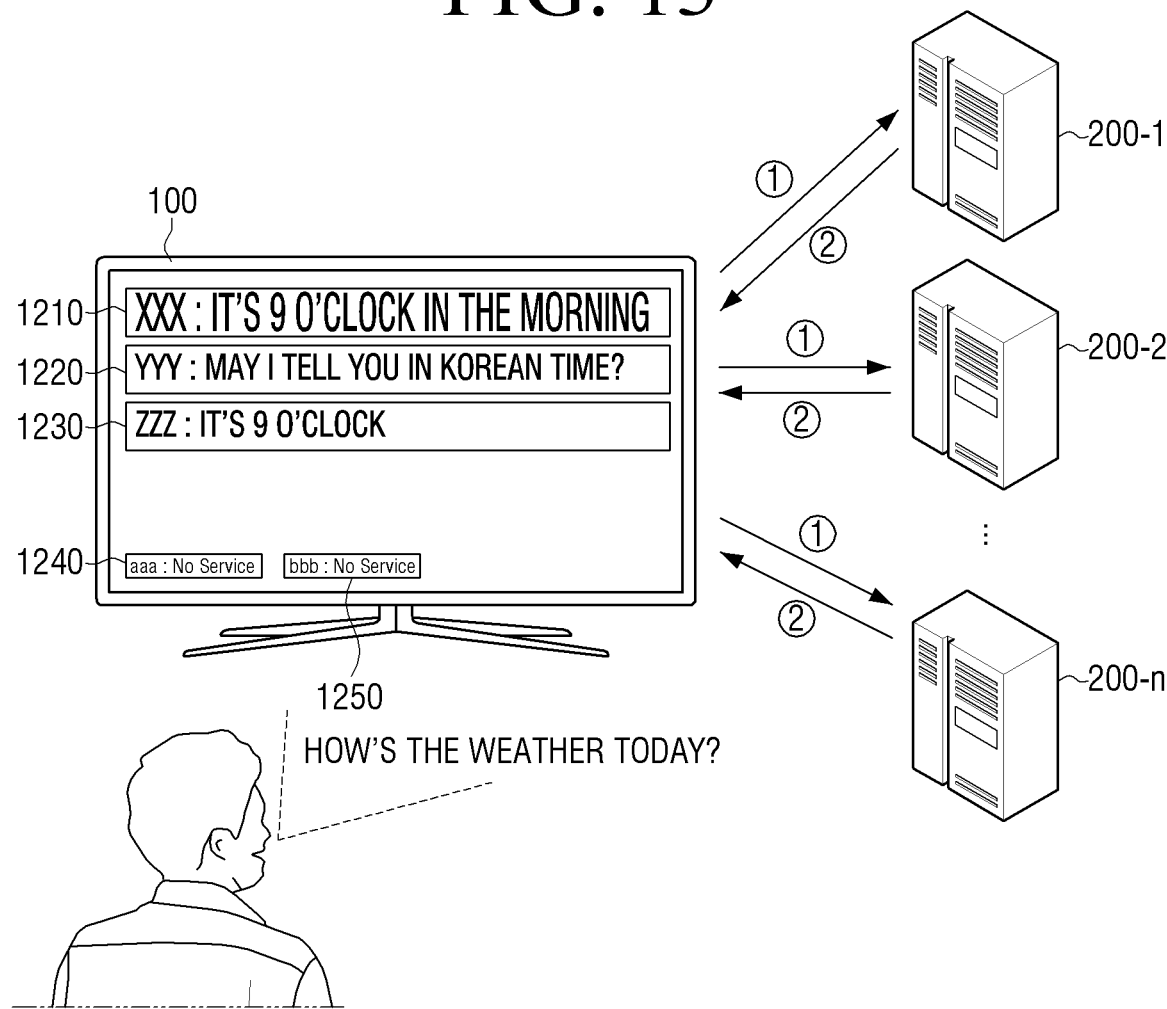
FIG. 13 is a view illustrating a method of providing an assistant service according to an embodiment of the disclosure.

FIG. 13 is a view illustrating a method of providing an assistant service according to an embodiment of the disclosure.

Referring to FIG. 13, it is assumed that the user utters "How's the weather today?".

In this case, the processor 130 may determine whether a wakeup word is present in "How's the weather today?" using the wakeup engine 131.

As the wakeup word is not present in the "How's the weather today?", the processor 130 may transmit information on the "How's the weather today?" which is the user voice to the plurality of servers 200-1, 200-2, . . . , 200-*n* as indicated by ① of FIG. 13, and the plurality of servers 200-1, 200-2, . . . , 200-*n* may generate response information on the "How's the weather today?" received from the electronic device 100 and transmit the generated response information to the electronic apparatus 100 as indicated by ② of FIG. 13.

The processor 130 may display a response on "How's the weather today?" on the display of the electronic apparatus 100 based on a plurality of response information received from the plurality of servers 200-1, 200-2, . . . , 200-*n*.

Because the wakeup word is not present in "How's the weather today?", the processor 130 may display a plurality of responses on "How's the weather today?" in the plurality of response information received from the plurality of servers 200-1, 200-2, . . . , 200-*n*.

Figure 14:
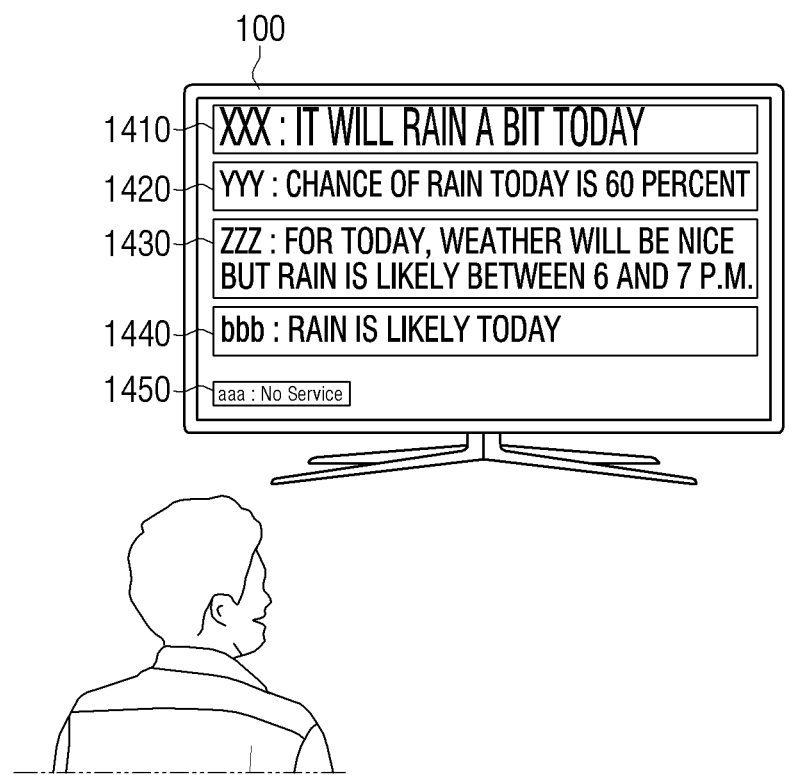
FIG. 14 is a view illustrating a method of providing an assistant service according to an embodiment of the disclosure.

FIG. 14 is a view illustrating a method of providing an assistant service according to an embodiment of the disclosure.

Referring to FIG. 14, the processor 130 may display "It will rain a bit today" 1410 based on the response information of XXX having a high user preference to have a size larger than "Chance of rain today is 60 percent" 1420, "For today, weather will be nice but rain is likely between 6 and 7 p.m." 1430, and "Rain is likely today" 1440 based on response information of YYY, ZZZ, and bbb. In addition, the processor 130 may provide a "No service" 1450 as a response of aaa which does not form response information, but may display the response to be smaller than the responses of the other assistant services.

Figure 15:
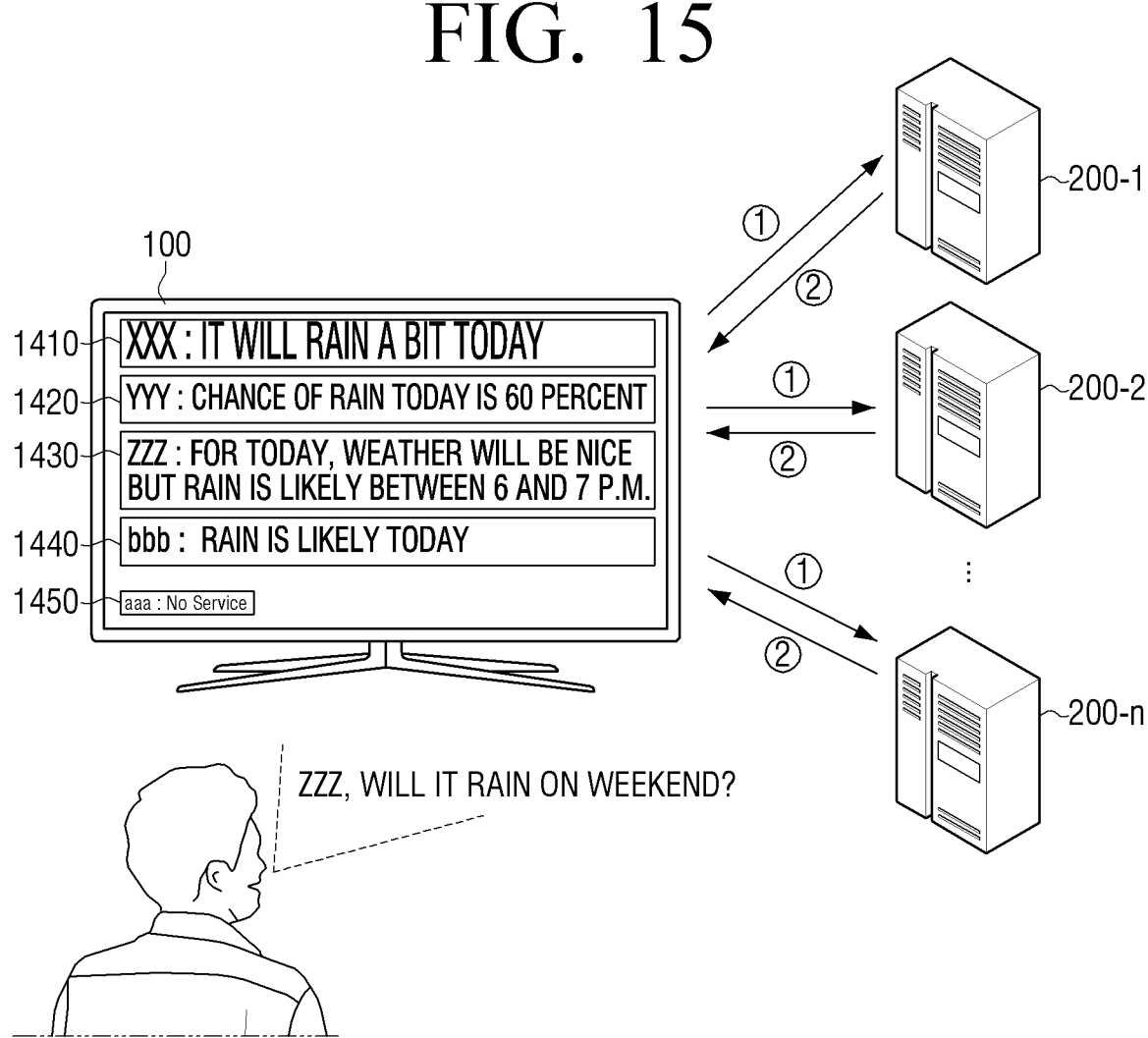
FIG. 15 is a view illustrating a method of providing an assistant service according to an embodiment of the disclosure.

FIG. 15 is a view illustrating a method of providing an assistant service according to an embodiment of the disclosure.

Referring to FIG. 15, it is assumed that the user utters "ZZZ, will it rain even on weekend?". ZZZ may be a wakeup word for a specific assistant service.

The processor 130 may determine whether a wakeup word is present in the "ZZZ, Will it rain even on weekend?" using the wakeup module 131.

Because the wakeup word "ZZZ" is present in "ZZZ, will it rain even on the weekend?", the processor 130 may transmit information on "Will it rain even on weekend?" which is the user voice excluding "ZZZ" to the plurality of servers 200-1, 200-2, . . . , 200-n as indicated by ①of FIG. 15, and the plurality of servers 200-1, 200-2, . . . , 200-n may generate response information on "Will it rain even on weekend?" received from the electronic apparatus 100 and transmit the generated response information to the electronic apparatus 100 as indicated by ② of FIG. 15.

Figure 16:
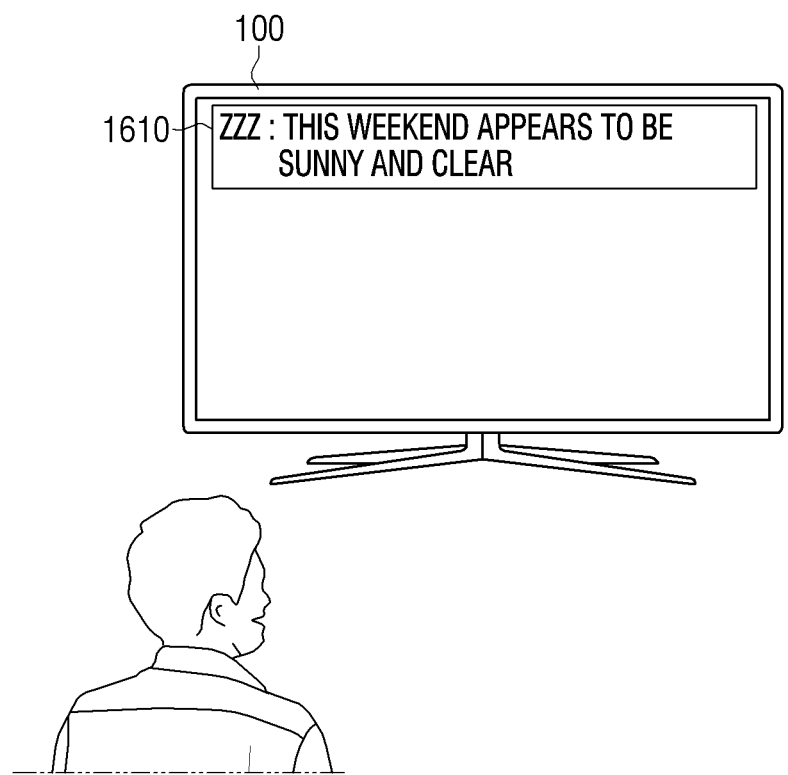
FIG. 16 is a view illustrating a method of providing an assistant service according to an embodiment of the disclosure.

FIG. 16 is a view illustrating a method of providing an assistant service according to an embodiment of the disclosure.

Referring to FIG. 16, the processor 130 may display "This weekend appears to be sunny and clear" 1610 on the display of the electronic apparatus 100 based on the response information received from the server providing the assistant service ZZZ that the user utters among the plurality of servers 200-1, 200-2, . . . , 200-n.

In this way, even if the user selects a predetermined button and executes the assistant service, when the user requests a response of a specific assistant service, the processor 130 may display only the response of the assistant service requested by the user. Further, the processor 130 may provide a continuous conversation with the corresponding assistant service according to whether the wakeup word is included in the user voice, or provide a response from another assistant service.

In the example described above, the response of the assistant service having a high user preference is displayed to be larger than the responses of the other assistant services according to the user preference, but this is merely an example. The processor 130 may display the response of the assistant service having the highest user preference, and display only the names of the other assistant services.

Figure 17A:
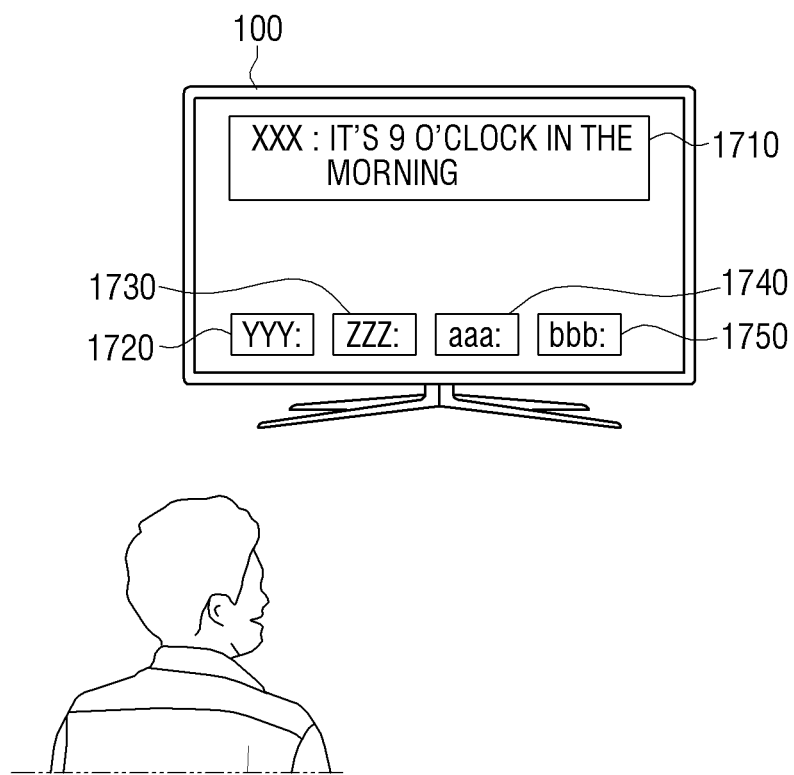
FIGS. 17A, 17B, and 17C are views illustrating a method of providing an assistant service according to various embodiments of the disclosure.
Figure 17B:
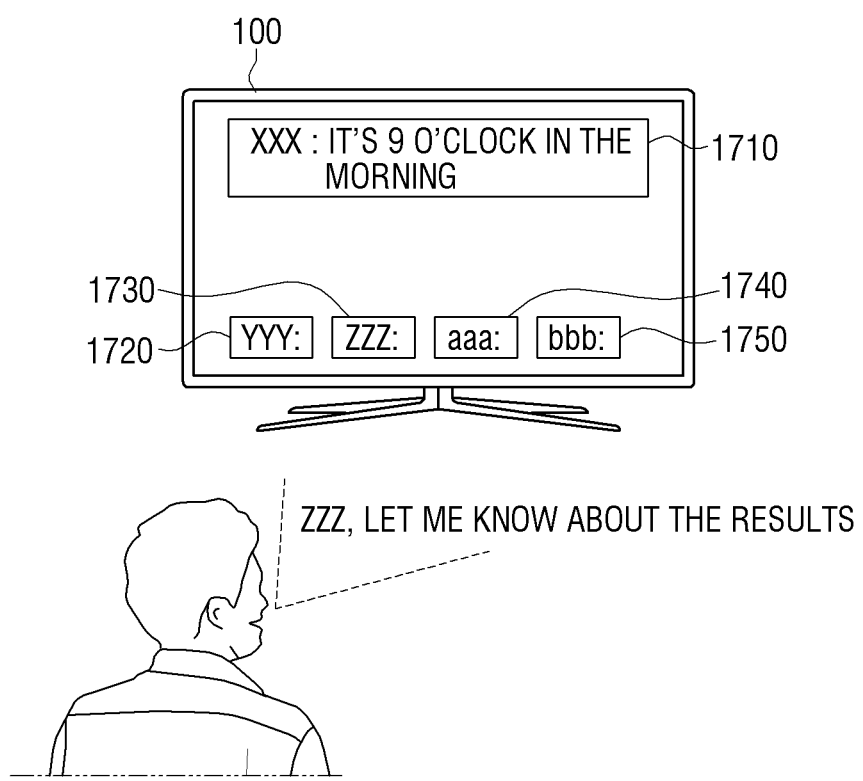
Figure 17C:
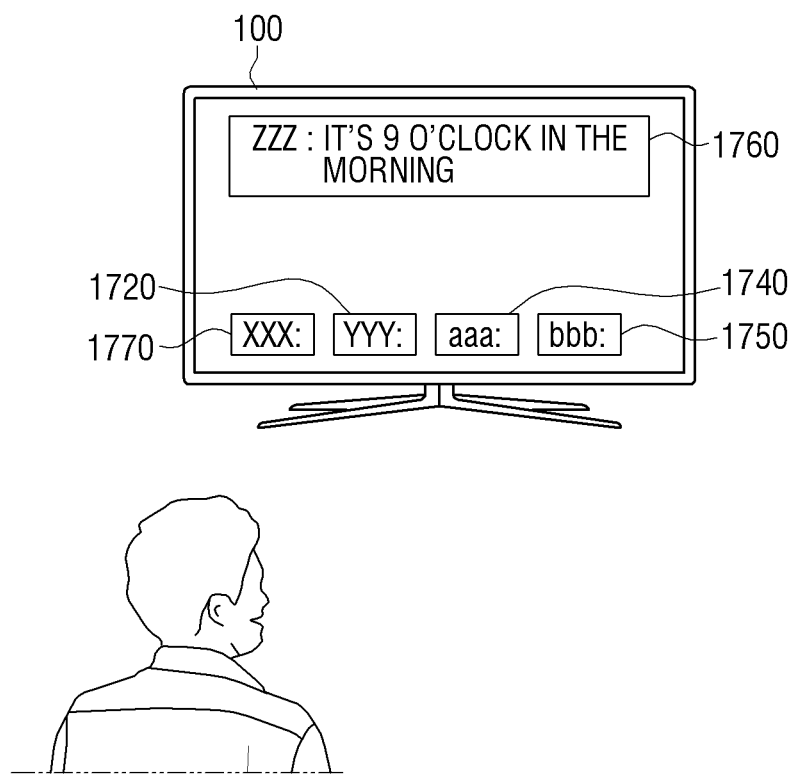

FIGS. 17A, 17B and 17C are views illustrating a method of providing an assistant service according to various embodiments of the disclosure.

For example, when the user utters "What time is it now?", the processor 130 may display "It's 9 o'clock in the morning" 1710 based on the response information of the assistant service XXX having high user preference, as shown in FIG. 17A. The processor 130 may display YYY 1720, ZZZ 1730, aaa 1740, and bbb 1750, which are names of other assistant services.

Thereafter, as shown in FIG. 17B, when the user utters "ZZZ, let me know about the result", the processor 130 may display "It's 9 o'clock" 1760 as shown in FIG. 17C based on the response information received from the server providing the assistant service ZZZ. In this case, the processor 130 may display XXX 1770, YYY 1720, aaa 1740, and bbb 1750 which are the names of other assistant services on the display.

In the example described above, it has been described that the response on the user voice is provided through the display of the electronic apparatus 100 but this is merely an example. The electronic apparatus 100 may output a response on the user voice, as a voice through a speaker provided in the electronic apparatus 100. The electronic apparatus 100 may provide a response in at least one form of a screen or a voice.

In addition, the response on the user voice may be provided by an electronic apparatus (not shown) other than the electronic apparatus 100. The user voice may be acquired by the electronic apparatus 100, but the response on the user voice may be provided by another electronic apparatus (not shown) connected to the electronic apparatus 100 instead of the electronic apparatus 100.

FIGS. 18A, 18B, 18C, and 18D are views illustrating a method of providing an assistant service according to various embodiments of the disclosure.

Referring to FIGS. 18A, 18B, 18C, and 18D, for example, it is assumed that the electronic apparatus 100 is realized as a speaker having a.

Figure 18A:
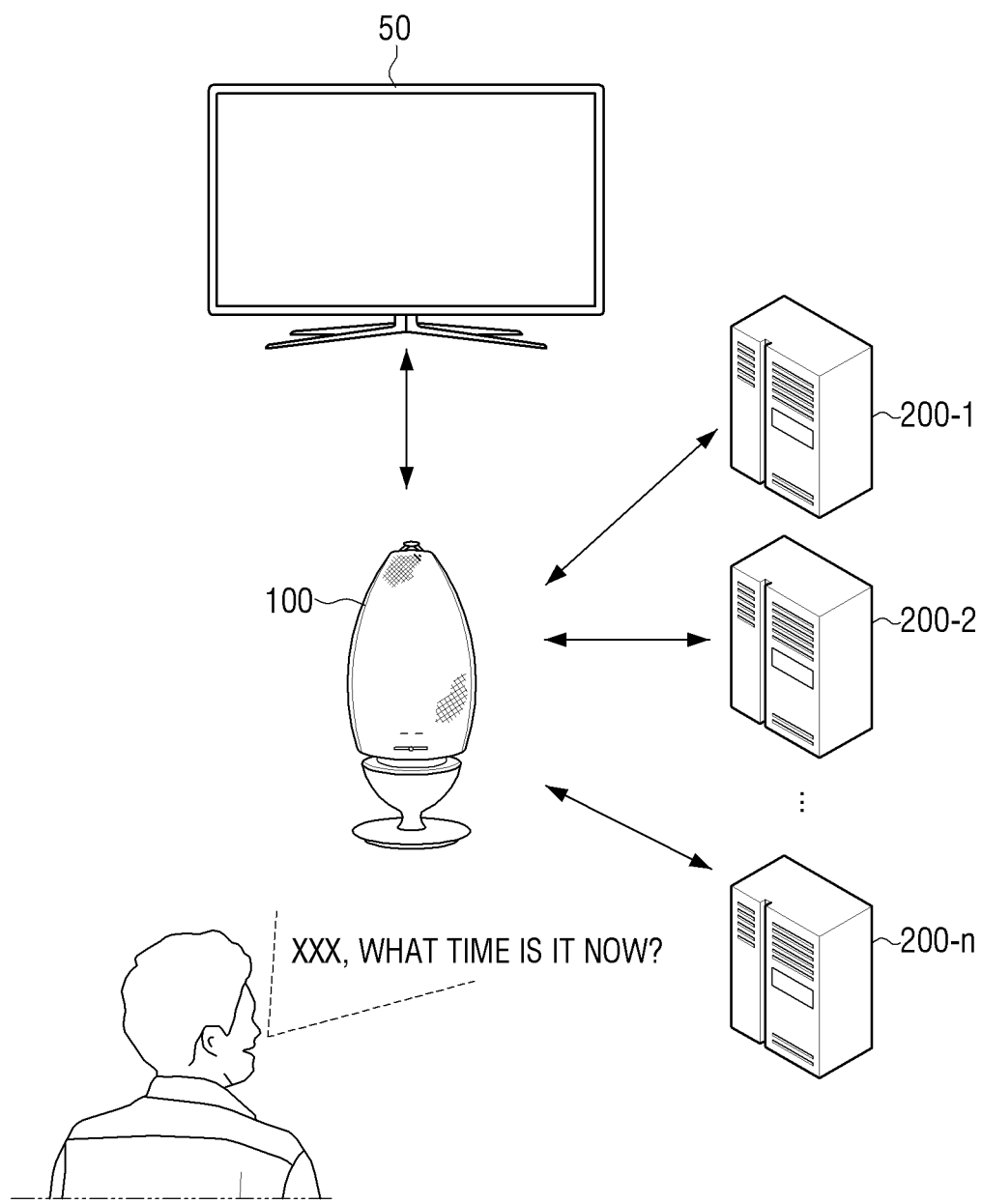
FIGS. 18A, 18B, 18C, and 18D are views illustrating a method of providing an assistant service according to various embodiments of the disclosure.

Referring to FIG. 18A, it is assumed that the user utters "XXX, what time is it now?".

When the user voice is received through the microphone, the processor 130 may transmit the information on the user voice to the plurality of servers 200-1, 200-2, . . . , 200-n. Accordingly, the plurality of servers 200-1, 200-2, . . . , 200-n may generate response information on the user voice and transmit the response information to the electronic apparatus 100.

In this case, the processor 130 may transmit response information received from the server providing the assistant service XXX called by the user among the response information received from the plurality of servers 200-1, 200-2, . . . , 200-n to the television 50.

Figure 18B:
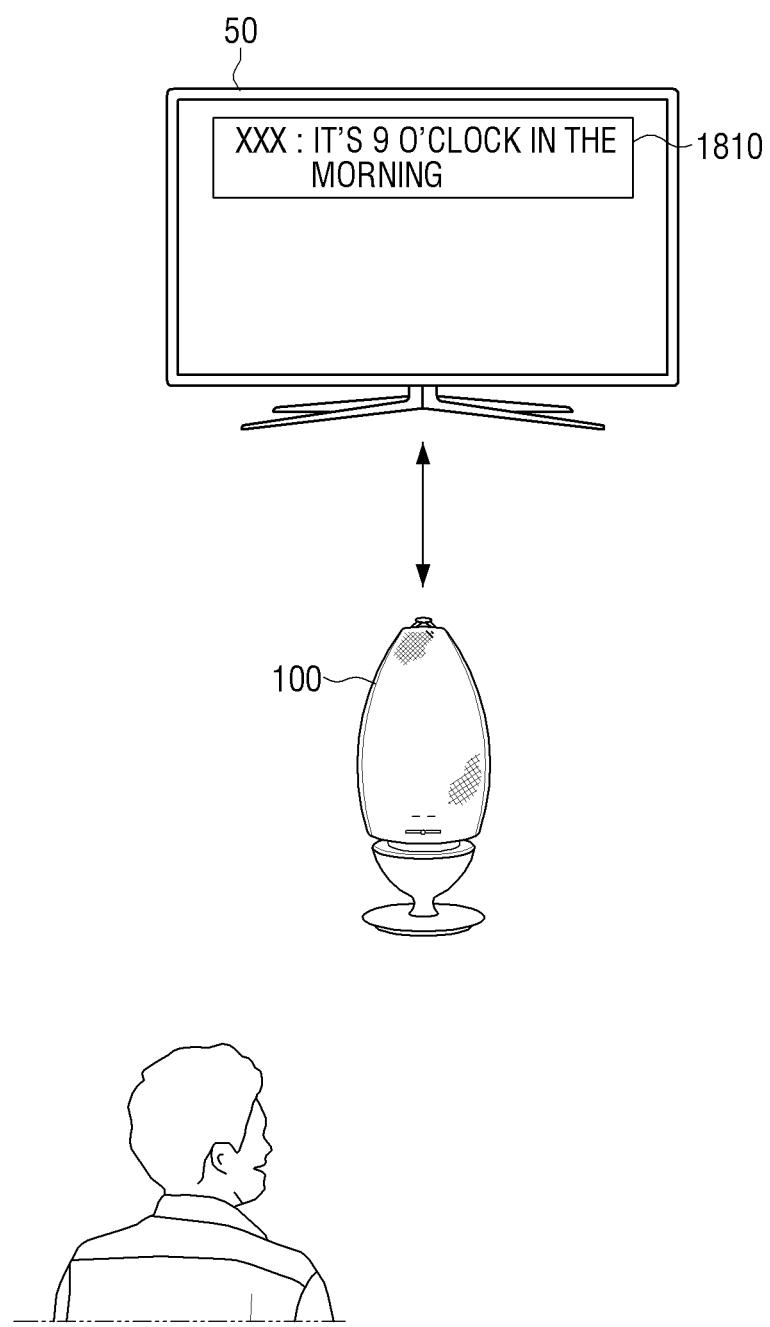

Referring to FIG. 18B, the television 50 may display "It's 9 o'clock in the morning" 1810 on the display based on the response information received from the electronic apparatus 100.

Figure 18C:
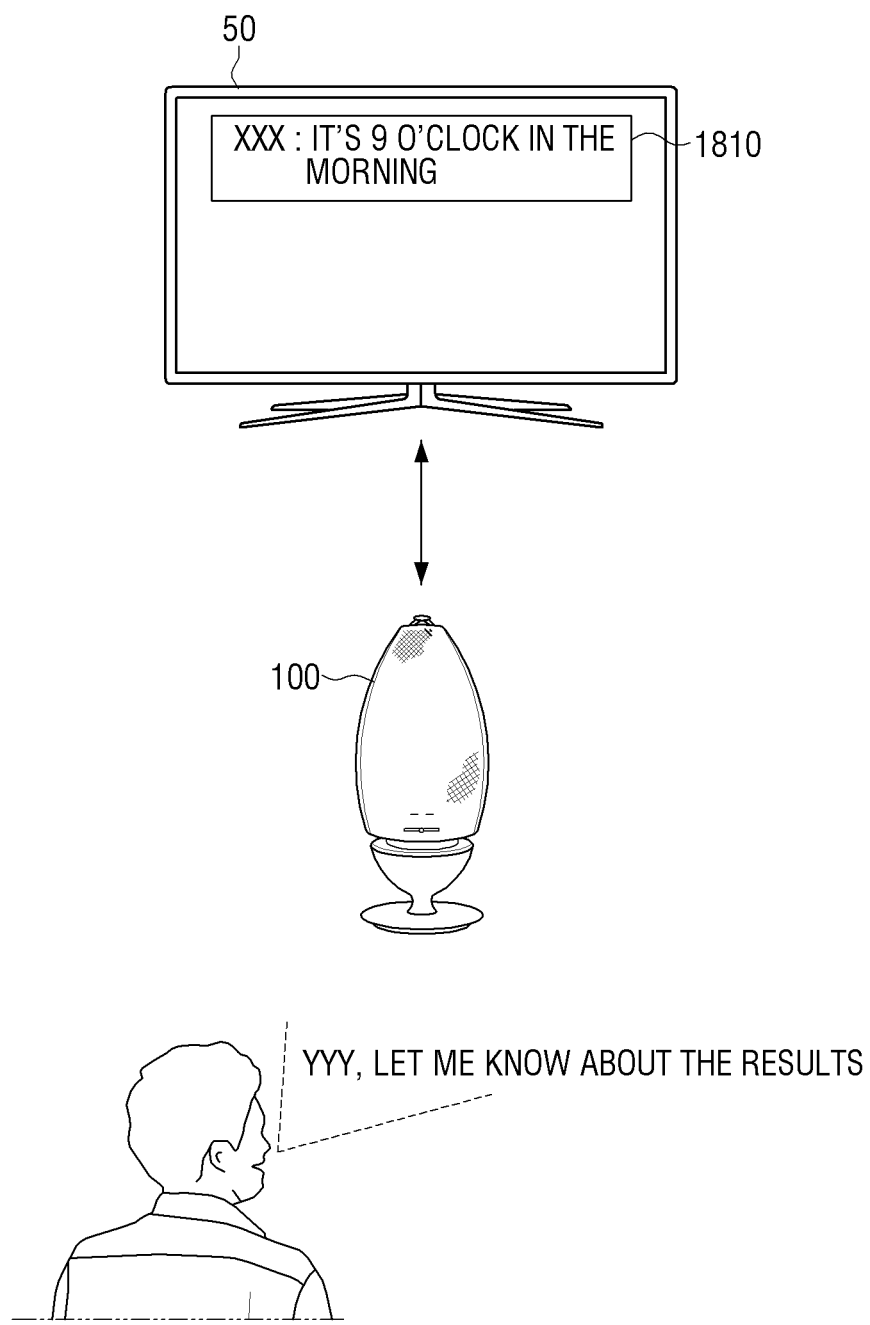

Referring to FIG. 18C, it is assumed that the user utters "YYY, let me know about the result".

When the user voice is received through the microphone, the processor 130 may determine whether the user voice corresponds to a voice requesting a response result of another assistant service. Since "YYY, let me know about the result" corresponds to a voice requesting a response result of the assistant service YYY, the processor 130 may transmit response information received from the server providing the assistant service YYY among previously received response information to the television 50.

Figure 18D:
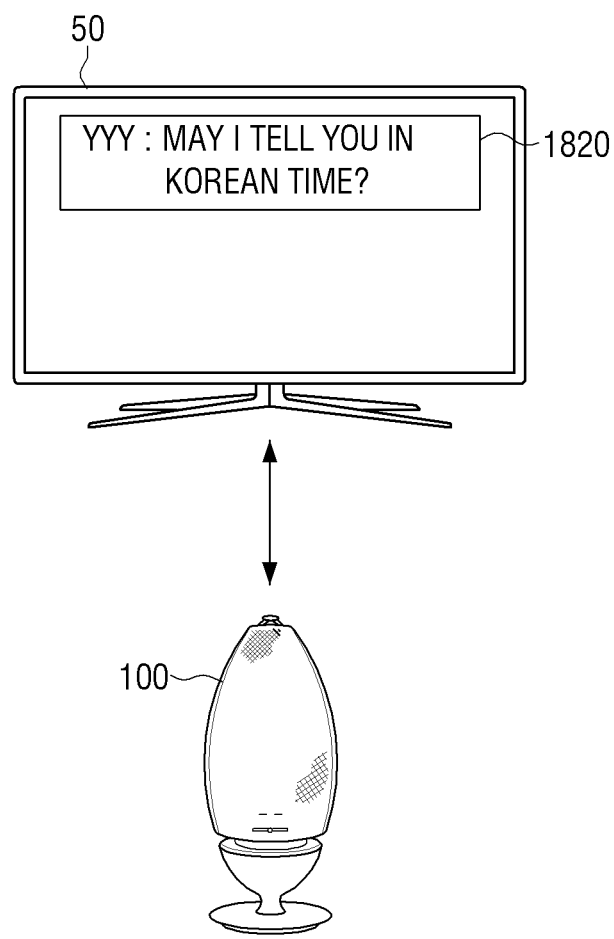

Referring to FIG. 18D, the television 50 may display "May I tell you in Korean time?" 1820 based on the response information received from the electronic apparatus 100.

In the example described above, it is described that the operations for speech recognition are performed in the plurality of servers 200-1, 200-2, . . . , 200-n. However, this is merely an example, and at least some of the operations for speech recognition may be performed by another electronic apparatus (not shown).

The processor 130 may perform preprocessing on the user voice and convert the user voice into text. In addition, the processor 130 may transmit information on the text converted from the user voice to the plurality of servers 200-1, 200-2, ..., 200-n. In this case, the plurality of servers 200-1, 200-2, ..., 200-n grasp an intent and an entity of the user voice from the text and transmit response information on the user voice based on a result of natural language understanding to the electronic apparatus 100.

In another example, the processor 130 may perform preprocessing on the user voice, convert the user voice into text, grasp the intent and the entity of the user voice in the text, and transmit information on a result of natural language understanding to the plurality of servers 200-1, 200-2, ..., 200-n. In this case, the plurality of servers 200-1, 200-2, ..., 200-n may acquire information on a response on the user voice based on the information received from the electronic apparatus 100, and acquire a natural language as response information on the user voice based on the acquired information. The plurality of servers 200-1, 200-2, ..., 200-n may transmit the response information to the electronic apparatus 100.

Figure 19:
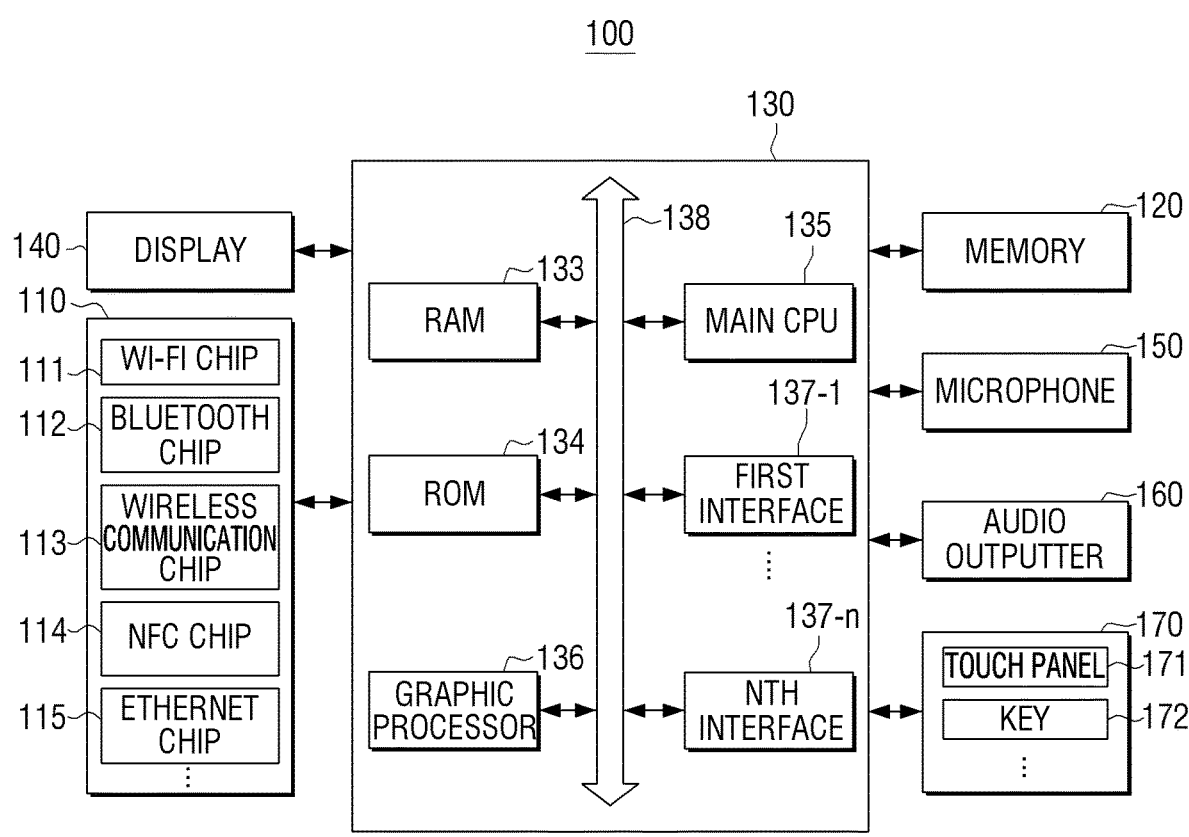
FIG. 19 is a block diagram illustrating a configuration of an electronic apparatus according to an embodiment of the disclosure.

FIG. 19 is a block diagram illustrating a configuration of an electronic apparatus according to an embodiment of the disclosure.

Referring to FIG. 19, the electronic apparatus 100 may include a communicator 110, a memory 120, a processor 130, a display 140, a microphone 150, an audio outputter 160, and a user inputter 170. These components may be controlled by the processor 130.

Because the communicator 110, the memory 120, and the processor 130 perform the same functions as the communicator 110, the memory 120, and the processor 130 illustrated in FIG. 2, a repeated description thereof will be omitted.

The communicator 110 may communicate with various types of external devices according to various types of communication methods. The communicator 110 may include at least one of a Wi-Fi chip 111, a Bluetooth chip 112, a wireless communication chip 113, an NFC chip 114, and an Ethernet chip 115.

In this case, the processor 130 may communicate with an external server or various external devices using the communicator 110.

For example, the processor 130 may transmit a user voice acquired by the electronic apparatus 100 to a server through the communicator 110, and receive a response information corresponding to the user voice acquired through an AI model. The processor 130 may receive a user voice acquired by an external electronic apparatus (not shown) through the communicator 110. The processor 130 may receive a signal indicating that a predetermined button is pressed in an external electronic apparatus (not shown) through the communicator 110.

The memory 120 may store a command or data related to at least one other component of the electronic apparatus 100. The memory 120 may be realized as a nonvolatile memory, a volatile memory, a flash-memory, a hard disk drive (HDD), a solid state drive (SSD), or the like. The memory 120 may be accessed by the processor 130 and data reading/writing/correcting/deleting/updating of data may be performed by the processor 130. In this document, the term of memory refers to the memory 120, a ROM (not shown) or a RAM (not shown) in the processor 130, or a memory card (not shown) (e.g., micro SD, a memory stick) mounted in the electronic apparatus 100.

In addition, the memory 120 may store programs, data, and the like for configuring various screens to be displayed on a display area of the display 140. In addition, the memory 120 may store various AI models of this document, for example, a model for determining whether a user voice corresponds to a voice requesting a response result of another assistant service. However, this is merely an example and the corresponding model may also be stored in an external electronic apparatus (not shown). In this case, the processor 130 may transmit the user voice to the external electronic apparatus (not shown) through the communicator 110 and receive a result recognized by the external electronic apparatus (not shown) from the external electronic apparatus (not shown).

The display 140 may display various screens. The processor 130 may display a response on the user voice on the display 140 based on response information received from the plurality of servers 200-1, 200-2, ..., 200-n. In this case, the screen displayed on the display 140 may include text representing a response on the user voice or the like.

At least a portion of the display 140 may be coupled in the form of a flexible display to at least one of a front region, a side region, and a rear region of the electronic apparatus 100. The flexible display may be bent, curved, or rolled without damage through a paper-like thin, flexible substrate.

In addition, the display 140 may be realized as a touch screen having a layer structure in combination with a touch panel 171. The touch screen may have a function of detecting even pressure of a touch input as well as a position of the touch input and a touched area, in addition to the display function, and may also have a function of detecting a proximity touch as well as a real-touch.

The microphone 150 may acquire a user voice. The microphone 150 may receive a user voice and generate it as a voice signal. In this case, the processor 130 may provide a response on the user voice using the voice signal.

The audio outputter 160 may be realized as a speaker to output various notification sounds or voice messages. In this case, the processor 130 may convert a response on the user voice into a voice and output the voice through the audio outputter 160.

The user inputter 170 may receive various user inputs and transfer the received user inputs to the processor 130. The user inputter 170 may include, for example, a touch panel 171 or a key 172. The touch panel 171 may use at least one of capacitive, resistive, infrared, or ultrasonic methods, for example. In addition, the touch panel 171 may further include a control circuit. The touch panel 171 may further include a tactile layer to provide a tactile response on the user. The key 172 may include, for example, a physical button, an optical key, or a keypad.

The user inputter 170 may transmit a user input for selecting a specific button provided in the user inputter 170 to the processor 130, and when the user input is received, the processor 130 may provide an assistant service using a user voice acquired afterwards.

The processor 130 (or the controller) may control an overall operation of the electronic apparatus 100 using various programs stored in the memory 120.

The processor 130 may be configured as a RAM 133, a ROM 134, a graphic processor 136, a main CPU 135, first to n-th interfaces 137-1 to 137-n, and a bus 138. The RANI 133, the ROM 134, the graphic processor 136, the main CPU 135, and the first to n-th interfaces 137-1 to 137-n may be connected to each other through the bus 138.

The electronic apparatus 100 according to an embodiment of the disclosure may provide various guides related to an assistant service, which will be described in detail with reference to FIGS. 20 and 21.

According to an embodiment of the disclosure, even when the user utters a specific wakeup word, the electronic apparatus 100 may transmit corresponding information to a server different from a server providing an assistant service corresponding to the wakeup word.

Service providers providing assistant services may determine which voice the user has uttered in using the assistant services using the user voice received by the plurality of servers 200-1, 200-2, . . . , 200-*n*.

In case where the assistant services of the service providers cannot provide a function or a response requested by the user, the service providers may allow the assistant service to learn to provide the corresponding function or response. When the learning is completed, the service providers may transmit a guide indicating that the corresponding function or the response can be provided through the server to the electronic apparatus 100.

Figure 20:
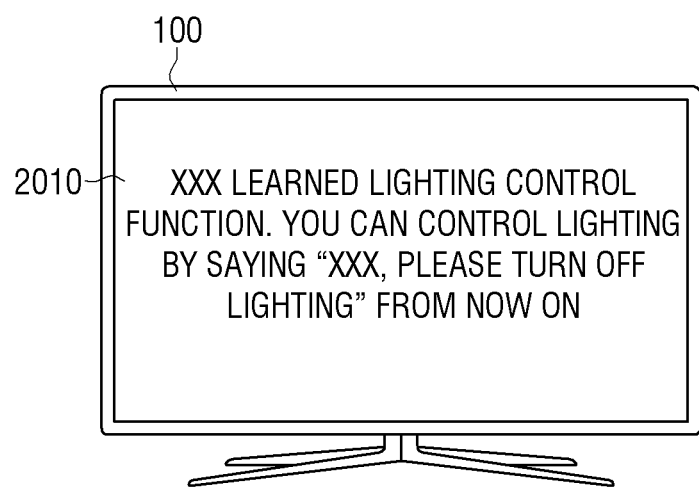
FIG. 20 is a view illustrating a method of providing a guidance related to an assistant service according to an embodiment of the disclosure.

FIG. 20 is a view illustrating a method of providing a guidance related to an assistant service according to an embodiment of the disclosure.

Referring to FIG. 20, in this case, the electronic apparatus 100 may display the information received from the server. For example, a guide such as "XXX learned a light control function. Light can be controlled by saying "XXX, turn off light" from now on" (2010) may be displayed.

In addition, the service providers may transmit a guide indicating that a function or response requested by the user can be provided in the assistant services of the service providers to the electronic apparatus 100.

Figure 21:
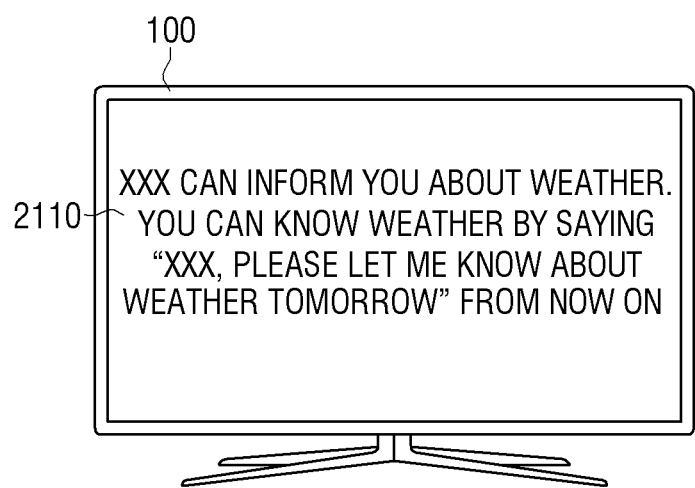
FIG. 21 is a view illustrating a method of providing a guidance related to an assistant service according to embodiment of the disclosure.

FIG. 21 is a view illustrating a method of providing a guidance related to an assistant service according to an embodiment of the disclosure.

Referring to FIG. 21, in this case, the electronic apparatus 100 may display information received from the server. For example, a guide such as "XXX can also inform about weather. Weather can be known by saying "XXX, please let me know about tomorrow weather" from now on" (2110) may be displayed.

Figure 22:
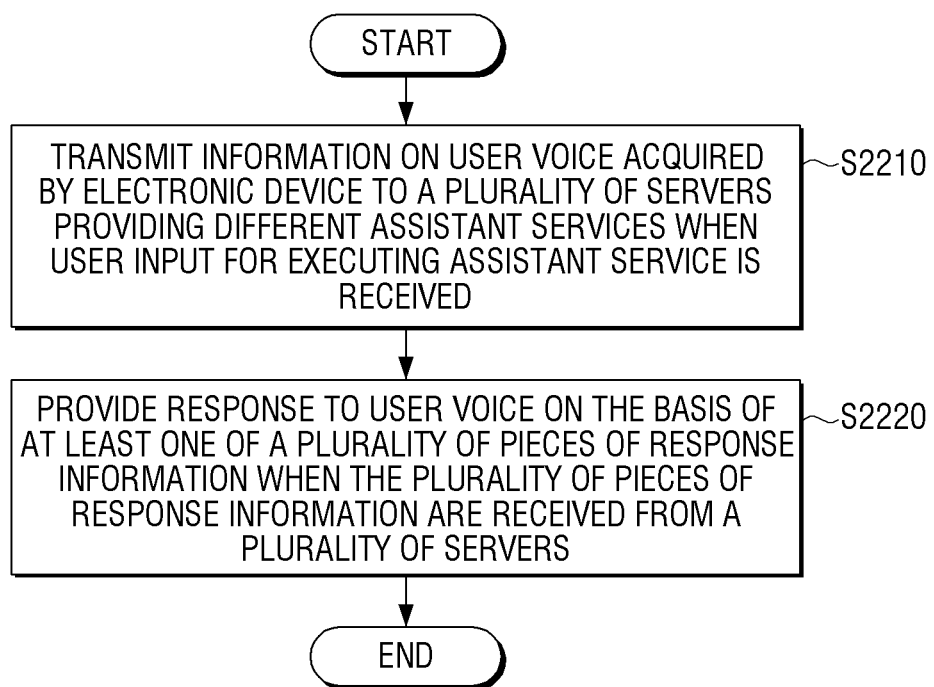
FIG. 22 is a flowchart illustrating an assistant service providing method according to an embodiment of the disclosure.

FIG. 22 is a flowchart illustrating an assistant service providing method of an electronic apparatus according to an embodiment of the disclosure.

Referring to FIG. 22, first, when a user input for executing an assistant service is received, information on a user voice acquired by the electronic apparatus is transmitted to a plurality of servers providing different assistant services operation S2210.

When a plurality of response information are received from a plurality of servers, a response on the user voice is provided based on at least one of the plurality of received response information operation S2220.

The plurality of servers may provide an assistant service using an AI agent.

In operation S2210, when a user input for executing a first assistant service is received, information on a user voice may be transmitted to the first server providing a first assistant service and a second server providing a second assistant service. In operation S2220, a response on the user voice may be provided based on the response information received from the first server among the plurality of response information received from the first and second servers.

In operation S2210, when a first wakeup word for executing the first assistant service is identified in a first user voice acquired by the electronic apparatus, information on the first user voice may be transmitted to a first server providing the first assistant service and a second server providing a second assistant service, and in operation S2220, a response on the first user voice may be provided based on the response information received from the first server among the plurality of response information received from the first server and the second server based on the transmission of the information on the first user voice.

It may be determined whether the second user voice acquired after the first user voice corresponds to a voice requesting a response result of another assistant service regarding the first user voice.

When the second user voice corresponds to a voice requesting a response result of the second assistant service regarding the first user voice, a response on the second user voice may be provided based on response information received from the second server among a plurality of response information received based on the transmission of the information on the first user voice.

When the second user voice does not correspond to a voice requesting a response result of the other assistant service, information on the second user voice may be transmitted to the first server and the second server, and a response on the second user voice may be provided based on the response information received from the first server among the plurality of response information received from the first server and the second server based on the transmission of the information on the second user voice.

When a user voice is acquired after a user input is received based on selection of a predetermined button, information on a user voice may be transmitted to a plurality of servers operation S2210, and when a plurality of response information are received from a plurality of servers, a plurality of responses for the user voice may be provided based on the plurality of response information operation S2220.

In this case, in operation S2220, a plurality of responses in different forms may be output based on at least one of a user preference for the plurality of assistant services provided by the plurality of servers and accuracy of the plurality of response information.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software including an instruction stored in a machine-readable storage medium readable by a machine (e.g., a computer). The machine may be a device that calls the instruction from the machine-readable storage media and operates depending on the called instruction and may include the electronic apparatus (e.g., the electronic apparatus A) according to the disclosed embodiments. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. The term "non-transitory", as used herein, is a limitation of the medium itself (i.e., tangible, not a signal) as opposed to a limitation on data storage persistency.

According to embodiments, the methods according to various embodiments of the disclosure may be included in a computer program product and provided. The computer program product may be traded as goods between a seller and a purchaser. The computer program product may be distributed as a device-readable storage medium (e.g., compact disk read only memory (CD-ROM)) or online through an application store (e.g., Play Store™). In the case of online distribution, at least part of the computer program product may be at least temporarily stored or temporarily created in a storage medium such as a server of a manufacturer, a server of an application store, or a memory of a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a communicator; and
   at least one processor configured to:
      based on a user voice input being received, control the communicator to transmit the user voice input to a server,
      receive, from the server, a plurality of response information generated by a plurality of voice assistants based on the user voice input, and
      based on the plurality of response information, provide a plurality of responses to the user voice input,
   wherein the plurality of response information comprises first response information generated by a first voice assistant and second response information generated by a second voice assistant, and
   wherein the at least one processor is further configured to:
      provide a first response to the user voice input based on the first response information, and
      based on a user voice input requesting another voice assistant being received after providing the first response, provide a second response to the user voice input based on the second response information.

2. The electronic apparatus of claim 1, wherein the second response information is associated with the first response information.

3. The electronic apparatus of claim 1, wherein the at least one processor is further configured to:
   provide the plurality of responses in different forms based on at least one of a user preference for the plurality of voice assistants or an accuracy of the plurality of response information.

4. The electronic apparatus of claim 3, wherein the providing of the plurality of responses in different forms comprises at least one of displaying a response having a highest user preference larger than other responses among the plurality of responses or displaying the response having the highest user preference in a color different from the other responses among the plurality of responses.

5. A voice assistant service providing method of an electronic apparatus, the method comprising:
   based on the electronic apparatus receiving a user voice input, transmitting the user voice input to a server;
   receiving, from the server, a plurality of response information generated by a plurality of voice assistants based on the user voice input; and
   based on the plurality of response information, providing a plurality of responses to the user voice input,
   wherein the plurality of response information comprises first response information generated by a first voice assistant and second response information generated by a second voice assistant, and
   wherein the method further comprises:
      providing a first response to the user voice input based on the first response information; and
      based on a user voice input requesting another voice assistant being received after providing the first response, providing a second response to the user voice input based on the second response information.

6. The method of claim 5, wherein the second response information is associated with the first response information.

* * * * *